US011068241B2

(12) United States Patent
Swope et al.

(10) Patent No.: US 11,068,241 B2
(45) Date of Patent: *Jul. 20, 2021

(54) GUIDED DEFINITION OF AN APPLICATION PROGRAMMING INTERFACE ACTION FOR A WORKFLOW

(71) Applicant: ServiceNow, Inc., Santa Clara, CA (US)

(72) Inventors: Stuart Dean Swope, San Diego, CA (US); Natallia Rabtsevich Rodriguez, San Diego, CA (US); Christopher Maloy, Payson, UT (US); Rebecca Anita Dias, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/705,993

(22) Filed: Dec. 6, 2019

(65) Prior Publication Data
US 2020/0301674 A1     Sep. 24, 2020

Related U.S. Application Data

(63) Continuation of application No. 16/358,276, filed on Mar. 19, 2019, now Pat. No. 10,521,195.

(51) Int. Cl.
*G06F 8/20* (2018.01)
*G06Q 10/06* (2012.01)
*G06F 9/54* (2006.01)

(52) U.S. Cl.
CPC .............. *G06F 8/20* (2013.01); *G06F 9/542* (2013.01); *G06Q 10/0633* (2013.01)

(58) Field of Classification Search
CPC ........ G06F 8/20; G06F 9/542; G06Q 10/0633
See application file for complete search history.

(56) References Cited

U.S. PATENT DOCUMENTS 5,630,069 A * 5/1997 Flores ................ G06Q 10/10
705/7.27
5,805,889 A  9/1998 Van De Vanter
(Continued)

OTHER PUBLICATIONS

Ramakrishanan et al, "Experiences with User-Centered Design for the Tigres Workflow API", IEEE, pp. 290-297 (Year: 2014).*
(Continued)

*Primary Examiner* — Anil Khatri
(74) *Attorney, Agent, or Firm* — Fletcher Yoder PC

(57) ABSTRACT

A computing system includes persistent storage configured to store definitions of actions for integration into workflows, and a software application configured to define an action that invokes a function of an application programming interface (API). The software application obtains a specification and identifies therein definitions of a uniform resource locator (URL) that addresses the API, the function, an input of the function, and an output of the function. The software application generates an input variable of the action that corresponds to the input of the function and an output variable of the action that corresponds to the output of the function. The software application determines a first mapping between the input variable and a URL parameter of the API and a second mapping between the output variable and a response from the API. The first and second mappings are stored in in the persistent storage to define the action.

20 Claims, 25 Drawing Sheets

(56) References Cited

U.S. PATENT DOCUMENTS

| | | | |
|---|---|---|---|
| 6,226,783 B1 | 5/2001 | Limondin | |
| 6,269,473 B1 | 7/2001 | Freed | |
| 6,601,233 B1 | 7/2003 | Underwood | |
| 6,609,122 B1 | 8/2003 | Ensor | |
| 6,678,887 B1 | 1/2004 | Hallman | |
| 6,757,893 B1 | 6/2004 | Haikin | |
| 6,772,407 B1 * | 8/2004 | Leymann | G06Q 10/0631 717/100 |
| 6,845,499 B2 | 1/2005 | Srivastava | |
| 6,985,939 B2 | 1/2006 | Fletcher | |
| 7,024,670 B1 * | 4/2006 | Leymann | G06Q 10/10 718/102 |
| 7,028,301 B2 | 4/2006 | Ding | |
| 7,059,536 B2 * | 6/2006 | Schneider | F24F 11/0001 237/2 A |
| 7,062,683 B2 | 6/2006 | Warpenburg | |
| 7,100,147 B2 * | 8/2006 | Miller | G06Q 10/0633 717/102 |
| 7,131,037 B1 | 10/2006 | LeFaive | |
| 7,170,864 B2 | 1/2007 | Matharu | |
| 7,184,967 B1 * | 2/2007 | Mital | G06Q 10/10 705/7.26 |
| 7,213,227 B2 | 5/2007 | Kompalli | |
| 7,350,209 B2 | 3/2008 | Shum | |
| 7,472,374 B1 | 12/2008 | Dillman | |
| 7,546,576 B2 | 6/2009 | Egli | |
| 7,603,363 B2 | 10/2009 | Haselden | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,895,566 B2 * | 2/2011 | Shenfield | G06F 8/20 717/107 |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,386,288 B2 * | 2/2013 | Ananian | G06Q 10/0633 705/7.13 |
| 8,438,533 B2 | 5/2013 | Fritzsche | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,719,773 B2 * | 5/2014 | Slone | G06F 8/34 717/109 |
| 8,743,121 B2 | 6/2014 | De Peuter | |
| 8,812,752 B1 * | 8/2014 | Shih | G06Q 10/063 710/29 |
| 8,868,441 B2 | 10/2014 | Bobak | |
| 8,887,133 B2 | 11/2014 | Behnia | |
| 8,983,982 B2 | 3/2015 | Rangarajan | |
| 9,043,747 B2 | 5/2015 | Eksten | |
| 9,047,165 B1 | 6/2015 | Mosterman | |
| 9,239,857 B2 | 1/2016 | Trinon | |
| 9,311,062 B2 | 4/2016 | Braun | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,646,117 B1 * | 5/2017 | Kotzabasakis | G06Q 10/0633 |
| 9,792,387 B2 | 10/2017 | George | |
| 9,952,837 B1 | 4/2018 | Maclay | |
| 9,958,571 B2 | 5/2018 | Al-Nuaim | |
| 10,101,972 B1 | 10/2018 | Nelson | |
| 10,203,937 B1 * | 2/2019 | Azaroff | G06F 8/20 |
| 10,810,361 B1 * | 10/2020 | Venkatraman | G06Q 10/103 |

OTHER PUBLICATIONS

Weske, "Formal Foundation and Conceptual Design of Dynamic Adaptations in a Workflow Management System", IEEE, pp. 1-10 (Year: 2001).*

Abbott et al, Experiences with Workflow Management: Issues for the Next Generation:, ACM, pp. 113-120 (Year: 1994).*

Muehlen et al, "Workflow-based Process Monitoring and Controlling—Technical and Organizational Issues", IEEE, pp. 1-10 (Year: 2000).*

Islam et al, "Oozie: Towards a Scalable Workflow Management System for Hadoop", ACM, pp. 1-10 (Year: 2012).*

Smartbear Software, What is OpenAPI?, About Swagger Specification, Retrieved on Mar. 14, 2019, 1 Page, https://swagger.io/docs/specification/about/.

Yau et al, "Integration in Component-Based Software Development Using Design Patterns", IEEE, pp. 369-374 (Year: 2000).

Sun et al, "Integration of user behaviour and product behaviour during the design phase: Software for behavioural design approach", International Journal of Industrial Ergonomics, pp. 100-114 (Year: 2013).

Wang et al, "Extracting URLs from JavaScript via Program Analysis", ACM, pp. 627-630 (Year: 2013).

McGregor et al, "Quantifying Value in Software Product Line Design", ACM, pp. 1-7 (Year: 2011).

Nguyen et al, "Object-oriented Configuration Management Technology can Improve Software Architectural Traceability", IEEE, pp. 1-8 (Year: 2005).

Schroder, "New Tools for Task Workflow Analysis", ACM, pp. 3877-3882, (Year: 2009).

Rybacki et al, "Using Workflows to Control the Experiment Execution in Modeling and Simulation Software", ACM, pp. 93-102 (Year: 2012).

Hee et al, "Yasper: a tool for workflow modeling and analysis", IEEE, pp. 1-3 (Year: 2006).

* cited by examiner

668 →

| Offboarding | Status: Draft | App: User Management | Edit | Test | Copy | Save | Activate |

| | State | Start time | Duration |
|---|---|---|---|
| Action | | | |
| 1. Look up records in [sc_request] when requested for is Trigger->[sys_user] Record | Complete | 09:08:15 | 120ms |
| 2. For each item in 1->[sc_request] Records | Complete | 09:08:15 | 2195ms |
| 2.1. Update 2->[sc_request] Record (Request state->Closed cancelled, Comments->"User no longer with company") | Complete | 09:08:16 | 796ms |
| Action | | | |
| 3. Look up records in [task] when assigned to is Trigger->[sys_user] Record | Complete | 09:08:17 | 43ms |
| 4. For each item in 3->[task] Records | Complete | 09:08:17 | 338ms |
| 4.1. Update 4->[task] Record (Assigned to->Trigger->[sys_user]->Manager) | Complete | 09:08:17 | 70ms |

FIG. 6K

```
1.  OPENAPI: 3.0.0                                                          700
2.  INFO:
3.    TITLE: SAMPLE API
4.    DESCRIPTION: THIS API PERFORMS FUNCTION 1, FUNCTION 2, ...
5.    VERSION: 1.0.5
6.
7.  SERVERS:
8.    - URL: HTTP://API.EXAMPLE.COM/V1
9.      DESCRIPTION: MAIN PRODUCTION SERVER
10.   - URL: HTTP://STAGING-API.EXAMPLE.COM
11.     DESCRIPTION: MAIN STAGING SERVER FOR TESTING
12.
13. PATHS:
14.   /USERS/{USER_ID}:
15.     GET:
16.       SUMMARY: RETURNS A USER BY ID.
17.       PARAMETERS:
18.         - IN: PATH
19.           NAME: USER_ID
20.           REQUIRED: TRUE
21.           DESCRIPTION: THE ID OF THE USER TO RETURN.
22.           SCHEMA:
23.             TYPE: INTEGER
24.             MINIMUM: 1
25.       RESPONSES:
26.         '200':
27.           DESCRIPTION: A USER OBJECT FOR THE SELECTED USER IS RETURNED.
28.           CONTENT:
29.             APPLICATION/JSON:
30.               SCHEMA:
31.                 TYPE: OBJECT
32.                 PROPERTIES:
33.                   ID:
34.                     TYPE: INTEGER
35.                     EXAMPLE: 4
36.                   NAME:
37.                     TYPE: STRING
38.                     EXAMPLE: JANE DOE
39.         '404':
40.           DESCRIPTION: A USER WITH THE SPECIFIED ID WAS NOT FOUND.
41.
42.
```

FIG. 7A

```
/USERS/(USER_GROUP)/GET_USER_BY_STATUS:                                    702
  GET:
    SUMMARY: RETURNS A USER IN USER_GROUP BASED ON STATUS OF THE USER.
    PARAMETERS:
      - IN: PATH
        NAME: USER_GROUP
        REQUIRED: TRUE
        DESCRIPTION: THE GROUP IN WHICH TO SEARCH FOR USERS.
        SCHEMA:
          TYPE: INTEGER
      - IN: QUERY
        NAME: STATUS
        SCHEMA:
          TYPE: STRING
        DESCRIPTION: THE STATUS OF THE USER TO RETURN – ACTIVE OR INACTIVE
      - IN: QUERY
        NAME: LIMIT
        REQUIRED: FALSE
        SCHEMA:
          TYPE: INTEGER
          DEFAULT: 20
        DESCRIPTION: THE MAX NUMBER OF USERS TO RETURN
    RESPONSES:
      '200':
        DESCRIPTION: A USER OBJECT FOR THE SELECTED USER IS RETURNED.
        CONTENT:
          APPLICATION/JSON:
            SCHEMA:
              TYPE: OBJECT
              PROPERTIES:
                ID:
                  TYPE: INTEGER
                NAME:
                  TYPE: STRING
                  EXAMPLE: JANE DOE
                STATUS:
                  TYPE: STRING
                  EXAMPLE: ACTIVE
                GROUP:
                  TYPE: INTEGER
      '404':
        DESCRIPTION: A USER WITH THIS STATUS WAS NOT FOUND IN THE GROUP.
```

FIG. 7B

```
1.  PATHS:                                                              704
2.    /PING:
3.      GET:
4.        SUMMARY: CHECKS IF THE SERVER IS ALIVE
5.        PARAMETERS:
6.          - IN: HEADER
7.            NAME: X-REQUEST-ID
8.            SCHEMA:
9.              TYPE: STRING
10.             FORMAT: UUID
11.           REQUIRED: TRUE
12.
```

FIG. 7C

```
1.  PATHS:                                                              706
2.    /USERS:
3.      GET:
4.        SUMMARY: RETRIEVES ALL USERS WHILE USING A CSRF TOKEN
5.        PARAMETERS:
6.          - IN: COOKIE
7.            NAME: DEBUG
8.            SCHEMA:
9.              TYPE: INTEGER
10.             ENUM: [0, 1]
11.             DEFAULT: 0
12.         - IN: COOKIE
13.           NAME: CSRF_TOKEN
14.           SCHEMA:
15.             TYPE: STRING
16.
```

FIG. 7D

GUIDED DEFINITION OF AN APPLICATION PROGRAMMING INTERFACE ACTION FOR A WORKFLOW

CROSS-REFERENCE TO RELATED APPLICATION

This application is a continuation of and claims priority to U.S. patent application Ser. No. 16/358,276, filed Mar. 19, 2019, which is hereby incorporated by reference in its entirety.

BACKGROUND

An application programming interface (API) provides a set of functions and associated communication protocols for building software. The functions provided by the API may be used by many different computing systems, especially when the API is accessible by way of a computer network. That is, the computing systems may utilize the API's functions rather than implementing separate, new versions of these functions. APIs generally provide clearly defined protocols, standards, and/or rules for interacting with the functions provided thereby. Thus, a computing system that utilizes the functions of an API may adhere to the protocols, standards, and rules specific to a particular API. By adhering to these rules, the computing system may invoke the functions of the API in a predefined manner and, in response, may receive output of the functions formatted in a specific, predictable fashion.

SUMMARY

A software-based workflow design tool may enable the specification and execution of workflows, which are specific sequences or series of tasks that, when performed, accomplish one or more goals. The workflow design tool may provide a graphical user interface by way of which the workflows may be defined with little to no writing of computer program code. Each workflow may include, among other elements, one or more actions configured to perform specific operations. Actions may be defined for integration into workflows using a software-based action design tool.

The software-based action design tool may allow actions to be defined that invoke and utilize functions provided by one or more remote APIs or other remotely accessible software interfaces. Such actions may allow an enterprise to take advantage of the computational resources provided by third-party computing systems by integrating these resources into the enterprise's workflows. Namely, an action may be configured to receive input values for a function of the API, generate and transmit, to the API, a request that includes therein the input values, receive a response from the API, identify output values of the function in the response, and expose the output values to other actions via output variables. In doing so, the action may be configured to adhere to the specific manner (e.g., format, protocol, data types, and/or other conventions) in which a particular API receives inputs and provides outputs.

In some implementations, the software-based action design tool may provide a user interface that allows for manual definition of an action that coordinates with an API. Namely, a programmer may determine the specific manner in which an API behaves by reviewing and understanding the documentation of the API (e.g., text in human-readable format). The action may be defined such that it adheres to the API behavior indicated by the documentation and may be tested to identify any errors in the definition of the action.

The software-based action design tool may additionally or alternatively be configured to perform operations that allow for automatic generation of actions for various API functions. Further, the software-based action design tool may allow such automatically-generated actions to be manually modified or adjusted to allow programmers to precisely control the behavior of the action (e.g., where multiple valid alternative action definitions are possible). In the absence of such actions defined (e.g., manually or automatically) with the assistance of the software-based action definition tool, some APIs might not be available for use in workflows. Additionally, automatic or guided definition of actions for API functions may be completed in seconds or minutes, as opposed to hours or days when done manually, thereby allowing a large number of API functions to be quickly and accurately made available for integration into workflows.

Namely, the action design tool may define an action that invokes an API function based on a specification of the API. The specification of the API may be a file that defines the functions provided by the API, the inputs of each function, how these inputs are to be provided to the API, the outputs of each function, and how these outputs are provided by the API, among other attributes of the functions, the inputs, and the outputs. The specification may be written in a computer-readable format that lends itself to parsing and analysis by the action design tool. Thus, the specification of the API programmatically defines the aspects of the behavior of the API that are relevant to consumers of this API.

In one example, the API specification may be provided by the third-party computing system that hosts the API. The specification may be obtained by the action design tool by way of a target uniform resource locator (URL) associated with the specification, by accessing the specification at a file system location, or by having a text copy of the specification pasted into a user interface of the action design tool.

The action design tool may parse the API specification and, based thereon, generate input variables for the action that correspond to the inputs of the function. The action design tool may additionally map the input variables to parameters of the API, including URL resource path parameters, URL query parameters, hypertext transfer protocol (HTTP) request header parameters, HTTP request body parameters, and/or HTTP cookie parameters, among other possibilities. That is, the action design tool may determine, based on the specification, how the API expects to receive the values of the inputs for a particular function. When the action is executed, the value of each input variable of the action may be assigned to its corresponding parameter and thereafter transmitted to the API as part of an HTTP request. In response, the API may transmit an HTTP response that includes therein the output values of the function.

Similarly, the action design tool may, based on the specification, generate output variables for the action that correspond to the outputs of the function. The action design tool may then map portions of the response to the output variables. That is, the action design tool may determine, based on the specification, how (i.e., in what portions or fields of the HTTP response) the API provides the values of the outputs of the particular function. When the action is executed, the response may be parsed to identify therein the value of each output of the function. Additionally, each of these output values of the function may be assigned to the corresponding output variable of the action.

Accordingly, the action allows a workflow designer to invoke the API function in the context of a workflow by specifying its input values, without needing to know any of the details regarding the behavior of the API (e.g., in what parameters it expects certain inputs to be provided). Additionally, the action allows these inputs to be determined by and obtained from other actions within the workflow, and allows the output of the API function to be passed to yet other actions of the workflow. Thus, from the perspective of the workflow designer, the action allows the API function to be utilized by the workflow much like any other function available locally from the workflow design tool (rather than remotely from an API).

Accordingly, in a first example embodiment, a computing system includes persistent storage configured to store definitions of actions for integration into workflows, one or more processors, and an action design software application configured to define an action that invokes a function of an API. The action design software application is configured to perform, by way of the one or more processors, operations that include obtaining a specification that defines attributes of the API and identifying, within the specification, definitions of (i) a URL that addresses the API, (ii) the function, (iii) an input of the function, and (iv) an output of the function. The operations also include generating (i) an input variable of the action that corresponds to the input of the function and (ii) an output variable of the action that corresponds to the output of the function. The operations additionally include determining a first mapping between the input variable and a URL parameter of the API. Execution of the action generates a modified version of the URL that includes therein a value of the input variable according to the first mapping and invokes the function by transmitting a request to the modified version of the URL. The operations further include determining a second mapping between the output variable and a response from the API, where the response is to the request. Reception from the API of the response causes a value of the output of the function to be stored in the output variable according to the second mapping. The operations yet further include storing the first mapping and the second mapping in the persistent storage to define the action.

In a second example embodiment, a method includes obtaining, by an action design software application configured to define an action, a specification that defines attributes of an API and identifying, within the specification, definitions of (i) a URL that addresses the API, (ii) a function of the API, (iii) an input of the function, and (iv) an output of the function. The method also includes generating, by the action design software application, (i) an input variable of the action that corresponds to the input of the function and (ii) an output variable of the action that corresponds to the output of the function. The method additionally includes determining, by the action design software application, a first mapping between the input variable and a URL parameter of the API. Execution of the action generates a modified version of the URL that includes therein a value of the input variable according to the first mapping and invokes the function by transmitting a request to the modified version of the URL. The method further includes determining, by the action design software application, a second mapping between the output variable and a response from the API, where the response is to the request. Reception from the API of the response causes a value of the output of the function to be stored in the output variable according to the second mapping. The method yet further includes storing the first mapping and the second mapping in persistent storage to define the action. The persistent storage is configured to store definitions of actions for integration into workflows.

In a third example embodiment, an article of manufacture may include a non-transitory computer-readable medium, having stored thereon program instructions that, upon execution by a computing system, cause the computing system to perform operations in accordance with the second example embodiment.

In a fourth example embodiment, a computing system may include at least one processor, as well as memory and program instructions. The program instructions may be stored in the memory, and upon execution by the at least one processor, cause the computing system to perform operations in accordance with the second example embodiment.

In a fifth example embodiment, a system may include various means for carrying out each of the operations of the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A, 6B, 6C, 6D, 6E, 6F, 6G, 6H, 6I, 6J, and 6K depict workflow design tool graphical user interfaces, in accordance with example embodiments.

FIGS. 7A, 7B, 7C, and 7D depict excerpts of an API specification, in accordance with example embodiments.

DETAILED DESCRIPTION

Figure 1:
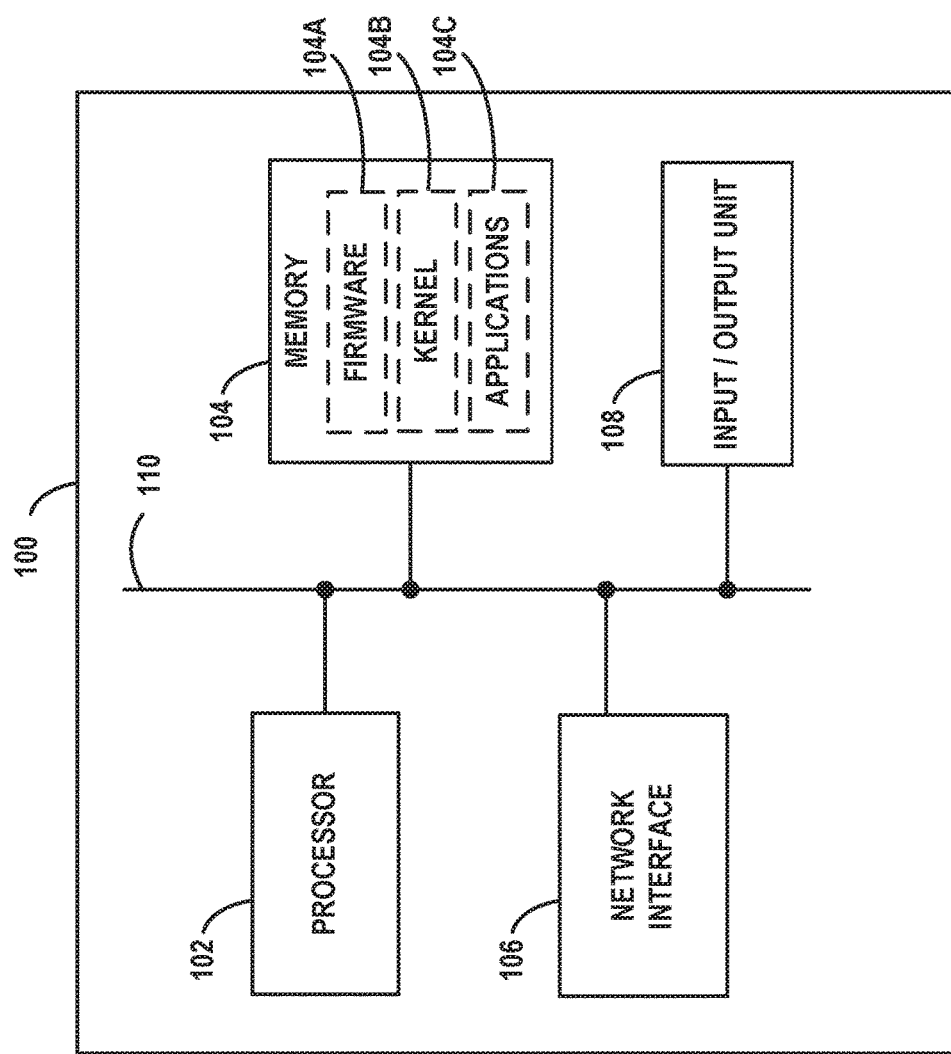
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality.

Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
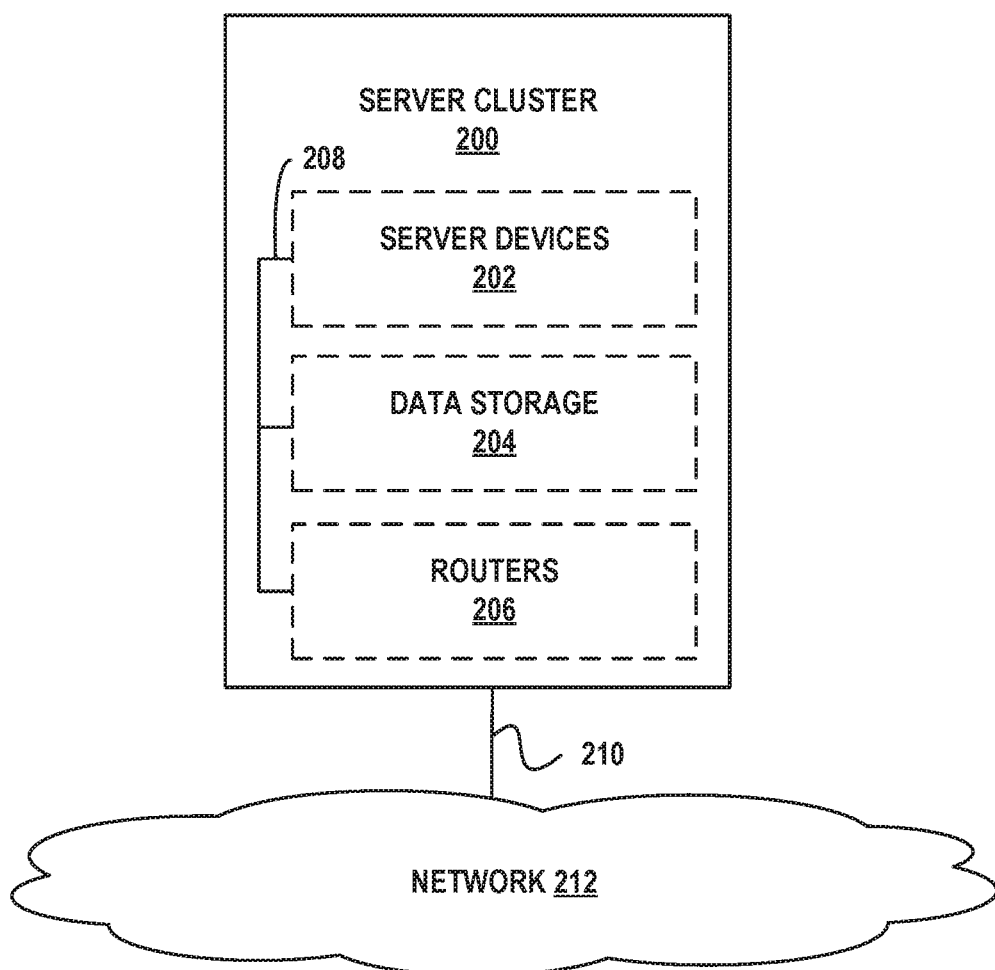
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
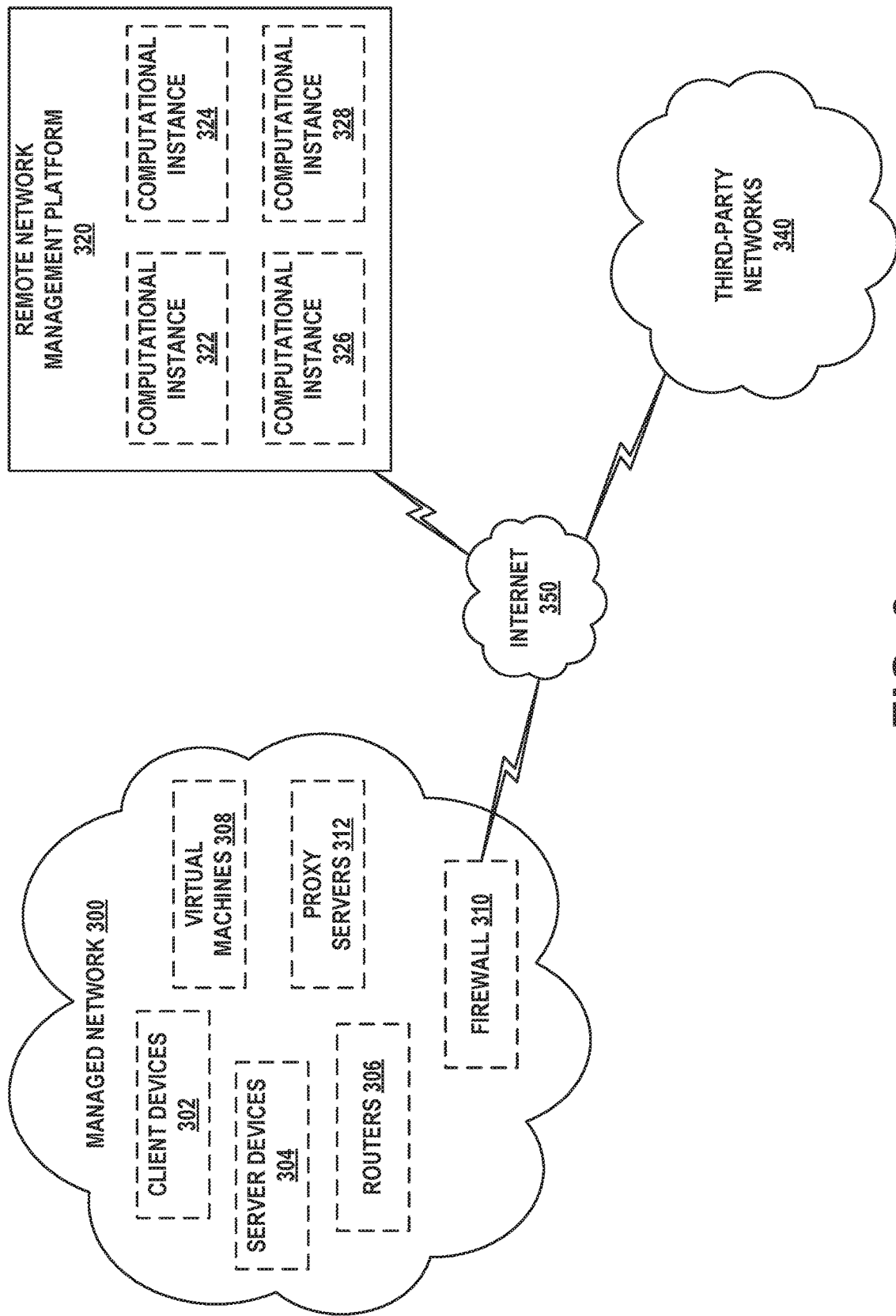
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
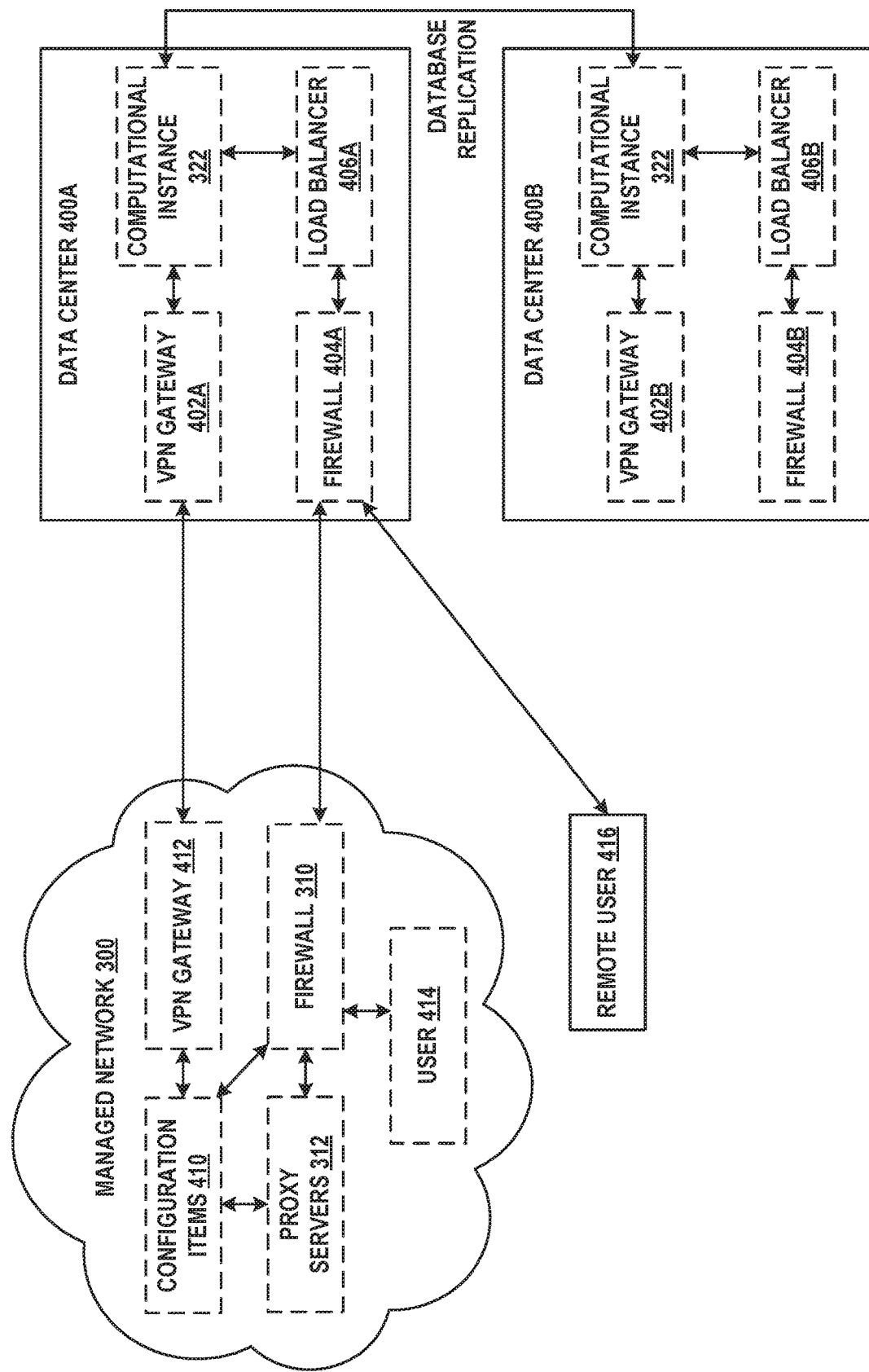
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
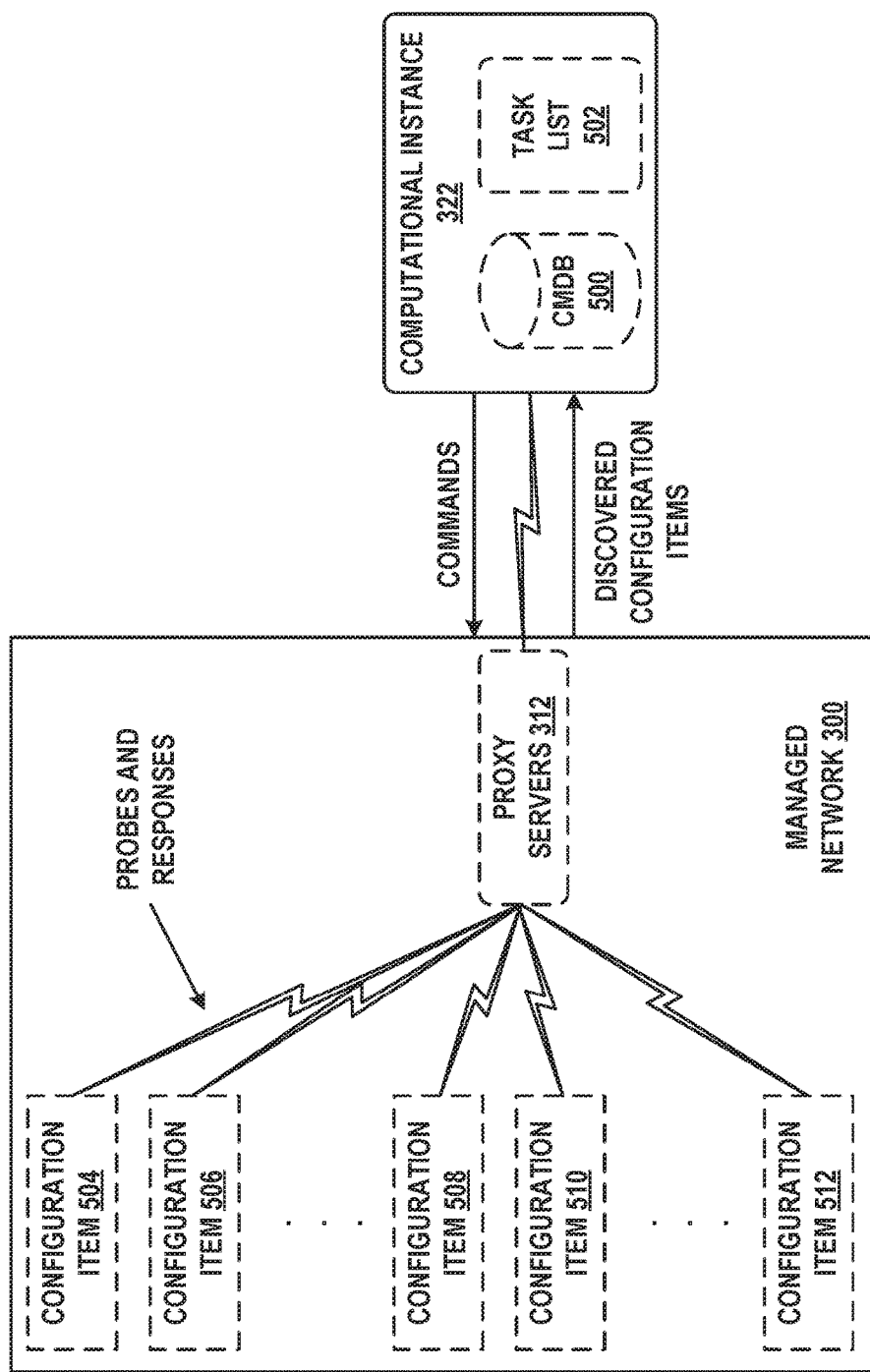
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
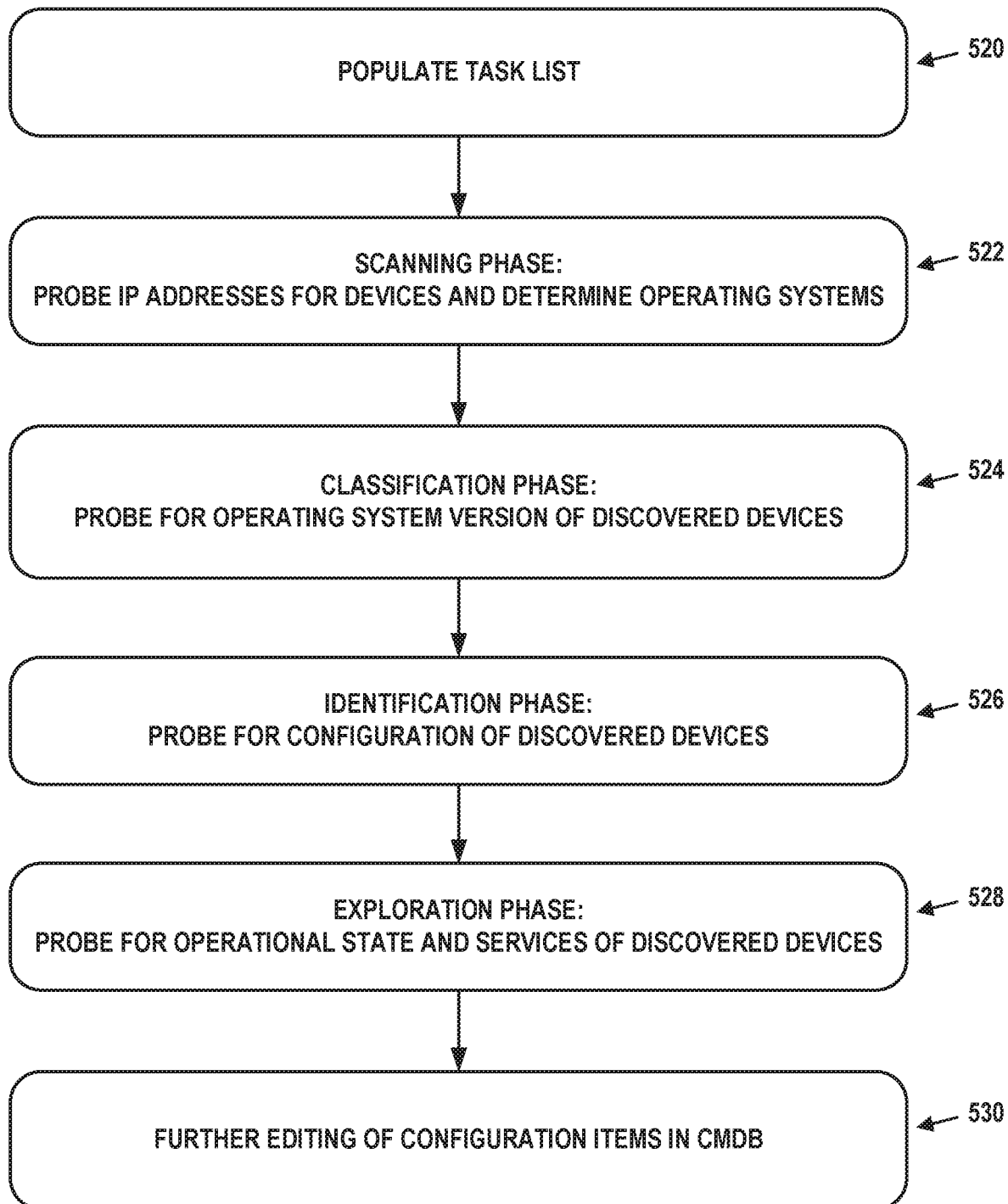
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE WORKFLOW DESIGN TOOL

Computational instances of the remote network management platform discussed herein may enable the specification and execution of workflows on behalf of their respective managed networks. A workflow is a specific sequence or series of tasks that, when performed, accomplish one or more goals. In some cases, workflows may be represented as flow charts, with one or more starting states, intermediate states, and ending states connected by various transitions therebetween. Some states may be visited zero times or more than one time. Also, some states may have more than one possible next state, thus representing a decision to be made in the workflow, either based on user input, automated input, information stored in a database, or by way of other mechanisms. Triggers may also be defined that cause certain transitions between states, input to be acquired, or output to be produced.

Such a workflow can be implemented on a computational instance through use of a software-based workflow design tool. Such a tool presents the workflow designer with options for defining the states, transitions, triggers, actions, input data, output data, and other characteristics of the workflow. The tool may utilize a GUI, and may be embodied as a series of one or more web pages and/or web-based applications deployed upon the computational instance. Once completed and released, employees of the managed network may make use of the workflow to carry out various tasks in an organized and efficient fashion. Notably, the workflow design tool can be a so-called "low-code/no-code" solution, with which designers either write very little program code, or no code at all, to implement the workflow.

While the embodiments herein provide support for general workflow design, an example workflow design tool may be implemented based around specific definitions of triggers, actions, and workflow logic. Triggers may be used to specify conditions that start a workflow, such as a change to an entry in a database (e.g., the addition or updating of a configuration item in a CMDB) or according to a schedule (e.g., once per day or once per week). A trigger causes one or more actions to be performed, and each action may be controlled by workflow logic that specifies the conditions that must be true for the action to be performed. The action may involve changing the state of information in a database, sending a notification (e.g., an email) to a user, and so on.

In some cases, sub-flows may be defined and incorporated into a workflow. A sub-flow may be an automated or semi-automated process including a sequence of reusable actions and specific data inputs that allow it to be started from within a flow, another sub-flow, or script. Thus, sub-flows can be applied to multiple workflows.

As an illustrative example of a workflow, consider an employee offboarding scenario, in which an employee has left an enterprise for some reason (e.g., the employee quit, got fired, passed away, etc.). The goals of the workflow are to: (i) look up and cancel any pending catalog requests (e.g., equipment requisitions) opened by the departed employee, and (ii) reassign any open tasks (e.g., pending approvals, units of work that are to be accomplished) assigned to the departed employee to his or her manager. In various embodiments, more or fewer goals may be present.

Figure 6A:
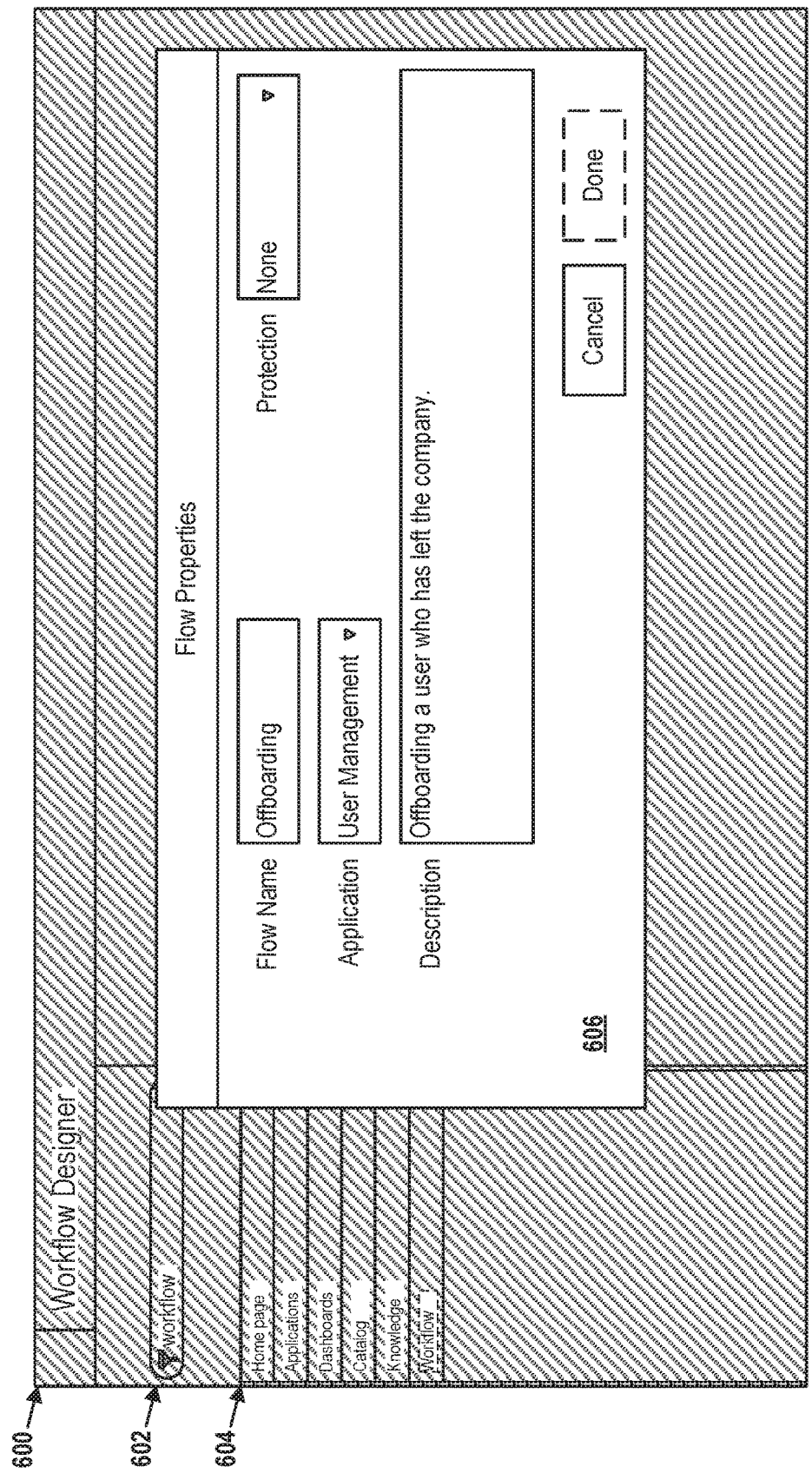

The workflow design tool may present the designer with a series of GUI pages that allow the designer to specify the workflow. Examples of such pages are shown in FIGS. 6A-6J, while results of an automated test of the workflow are shown in FIG. 6K. Notably, these examples are merely for purposes of illustration and not intended to be limiting. The workflow design tool may be able to provide other GUIs including alternative arrangements of information usable for designing workflows.

FIG. 6A depicts GUI 600. The background of GUI 600 shows a web-based menu for selecting features and/or applications supported by a computational instance. This background is denoted as such by hash marks.

For example, GUI 600 includes dialog box 602 in which a user has entered the search term "workflow". This selects the workflow design tool from the bottom of menu 604. This selection is reflected by the text "Workflow Designer" appearing at the top of GUI 600.

GUI 600 also includes pop up window 606. Alternatively, window 606 may be a pane overlaid on top of GUI 600 and not a separate window. Regardless, window 606 allows a user to initiate creation of a new workflow by specifying its properties. In GUI 600, these properties are the workflow's name "Offboarding", the workflow's scoped application "User Management", the workflow's description "Offboarding a user who has left the company", and whether the workflow is to be protected. In alternative embodiments more or fewer properties may be specified.

The workflow's name may be free-form text entered by the user. The workflow's scoped application may be selected from a drop-down menu of applications or specified as global. As the workflow in GUI 600 is limited to the "User Management" scoped application, this workflow may be considered to be part of this application. The workflow's description may also be free-form text. The workflow's protection specifies whether it is modifiable ("none") or read-only ("read-only") by other workflow designers or users.

Once the user is satisfied with the information entered in window 606, the user may select or otherwise activate the "Done" button. This selection is denoted in FIG. 6A by this button being depicted with a dashed line. Once the user completes the dialog of window 606, the next phase of the workflow design tool, which allows the user to specify a trigger, may be displayed.

Figure 6B:
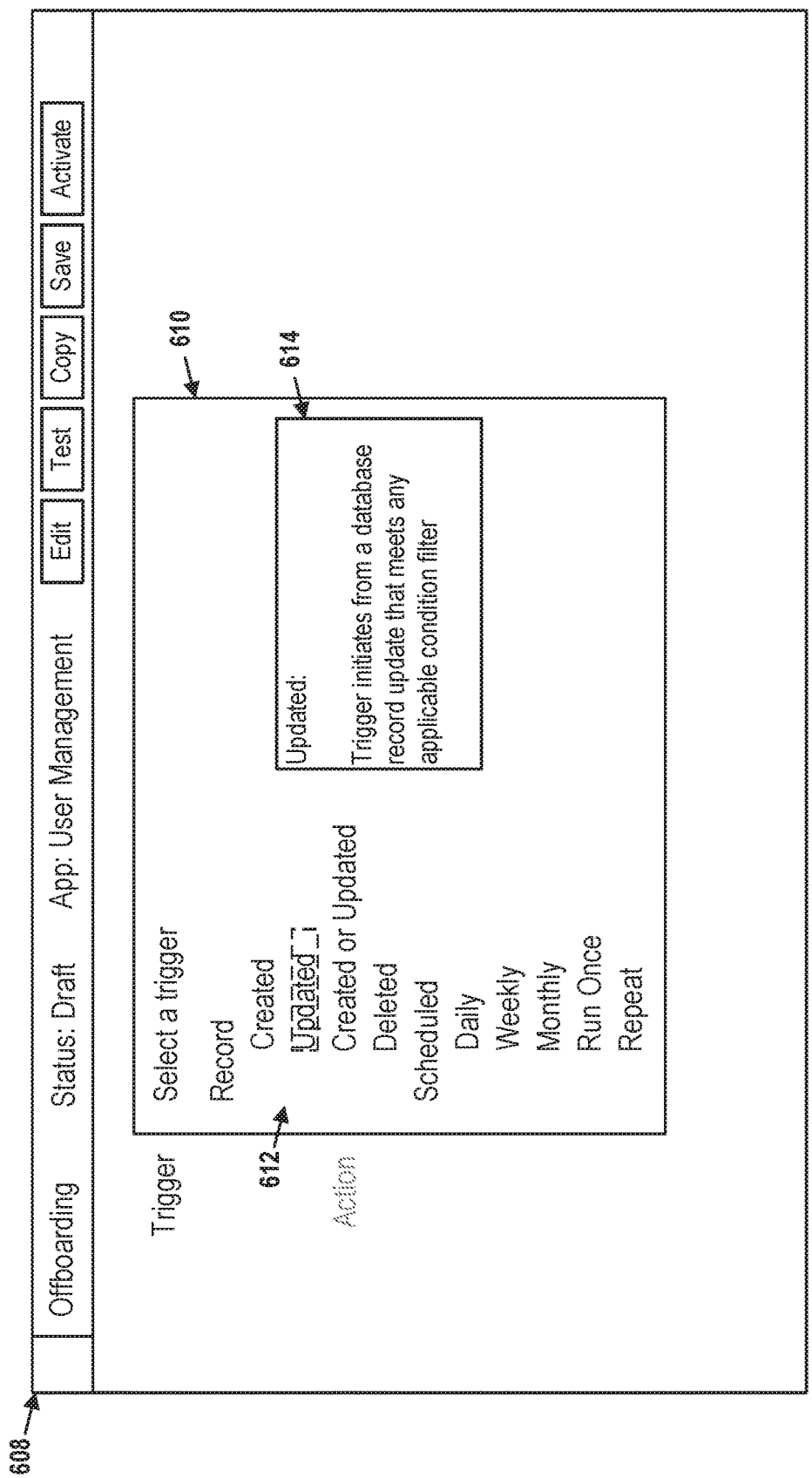

FIG. 6B depicts the first part of the trigger specification phase in GUI 608. The top of GUI 608 specifies the workflow's name, "Offboarding", as entered into window 606. This section of GUI 608 also indicates that this workflow is currently in draft form and is part of the "User Management" scoped application. GUI 608 further displays a series of buttons that allow a user to edit, test, copy, save, and activate the workflow, respectively. In alternative embodiments, different types of information about the workflow may be displayed, and there may be more or fewer buttons potentially with different functionality.

Notably, hashmarks are omitted from the background of GUI 608 (as well as all further GUIs) for purposes of readability. Also, the word "Trigger" is shown in a regular, dark color to indicate that a trigger is being specified, while the word "Action" is shown in a lighter color to indicate that action specification is not taking place.

Pop up window 610 (which, like window 606, may be a pane overlaid on top of GUI 608 and not a separate window), may allow a user to specify a trigger for the workflow. As noted previously, two main types of triggers may be supported and these types are shown in menu 612. Record-based triggers may cause a workflow to be performed when a change to one or more specific database records occurs. As depicted in menu 612, these changes may include creation of a record, updating of a record, creation or updating of a record, and deletion of a record. Scheduled triggers may cause a workflow to be performed at one or more specified times. As depicted in menu 612, such a schedule may trigger a workflow daily, weekly, monthly, just once (at a specified time), or to repeat at a user-specified interval.

In FIG. 6B, menu 612 indicates, with a dashed line, that the user has selected a trigger for when a record is updated. This may cause information box 614 to be displayed, which explains the behavior of the selected trigger.

Figure 6C:
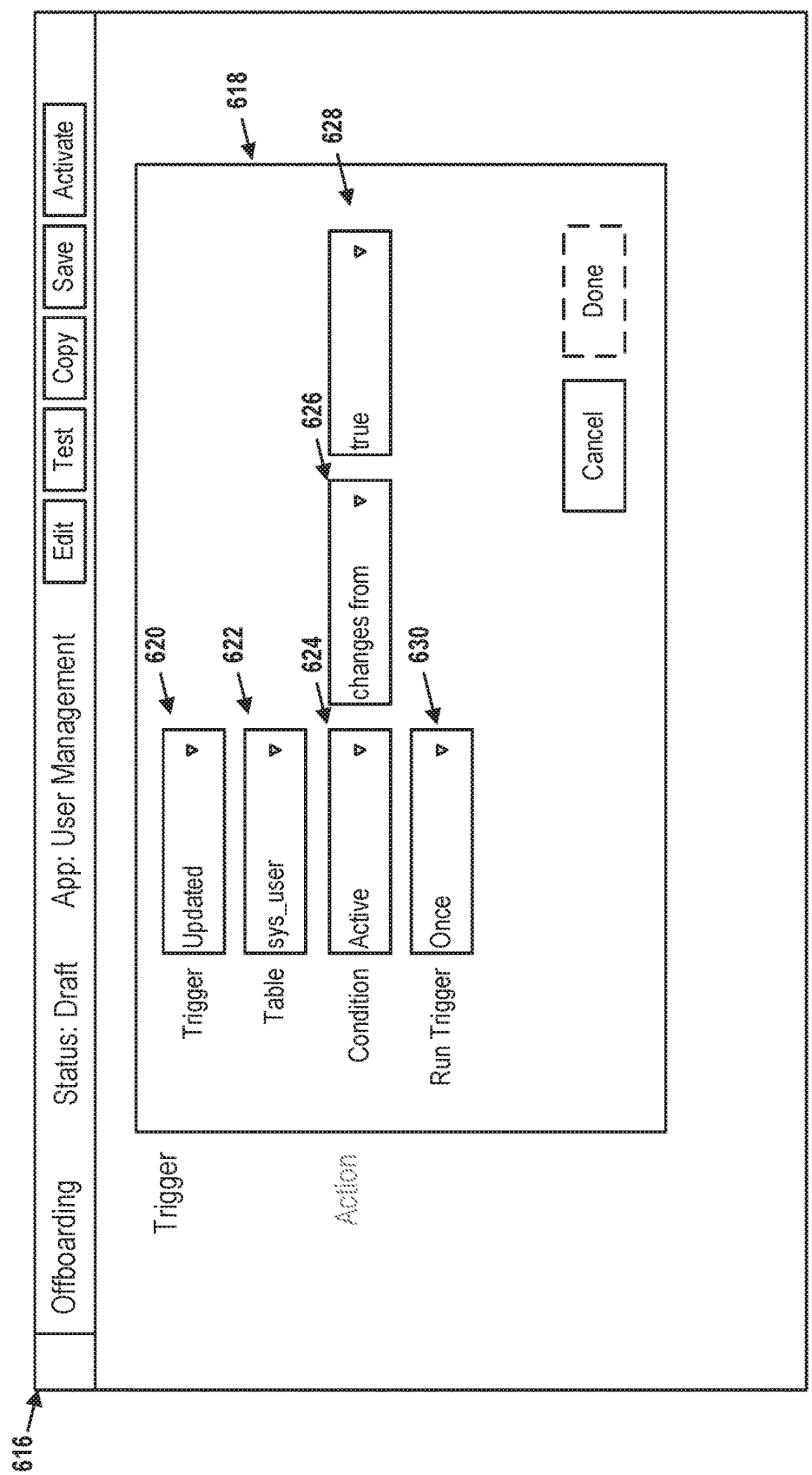

FIG. 6C depicts the second part of the trigger specification phase in GUI 616. GUI 616 assumes that the selection shown in FIG. 6B has been finalized. Thus, GUI 616 depicts pop up window 618 (which, like window 606, may be a pane overlaid on top of GUI 616 and not a separate window), that may allow a user to further specify a trigger for the workflow.

Window 618 contains a number of drop-down menus, some of which may be automatically populated based on the user's selection(s) from GUI 608. Particularly, trigger menu 620 may be populated to reflect the user's selection of the "Updated" option, and run trigger menu 630 may be populated to reflect that record-based triggers are expected to just run once. Nonetheless, the user may modify these selections in window 618.

Table menu 622 allows the user to specify a database table in which records can be found. As shown, this table is sys user, which is assumed to contain one entry for each employee in the company. Table menu 622 may be capable of displaying a list of one or more available tables.

Condition menus 624, 626, and 628 allow the user to specify a condition of records in the selected table that will cause the workflow to be performed. This condition may be a state or a transition. For instance, condition menu 624 specifies "Active" to indicate that the records must be active, condition menu 626 specifies "changes from" to indicate records that change from active, and condition menu 628 specifies "true" to indicate any record that changes from active to another state.

In various embodiments, condition menu 624 may include entries for various fields in the sys user table. These fields may include the phone number, building, city, department, address, manager, role, and so on. Condition menu 626 may include entries for "is", "is not", "is empty", "is not empty", "is anything", "is same as", "is different from" "changes", "changes from", "changes to", and/or various other logical operations. Condition menu 628 may include entries for items that are contextually based on the selections made for condition menus 624 and 626.

Viewed as a whole, the trigger specification of window 618 indicates that the workflow is to be performed once when any entry in the sys user table is updated from active to another state (e.g., inactive). This would indicate that the user is no longer an active employee of the company.

Figure 6D:
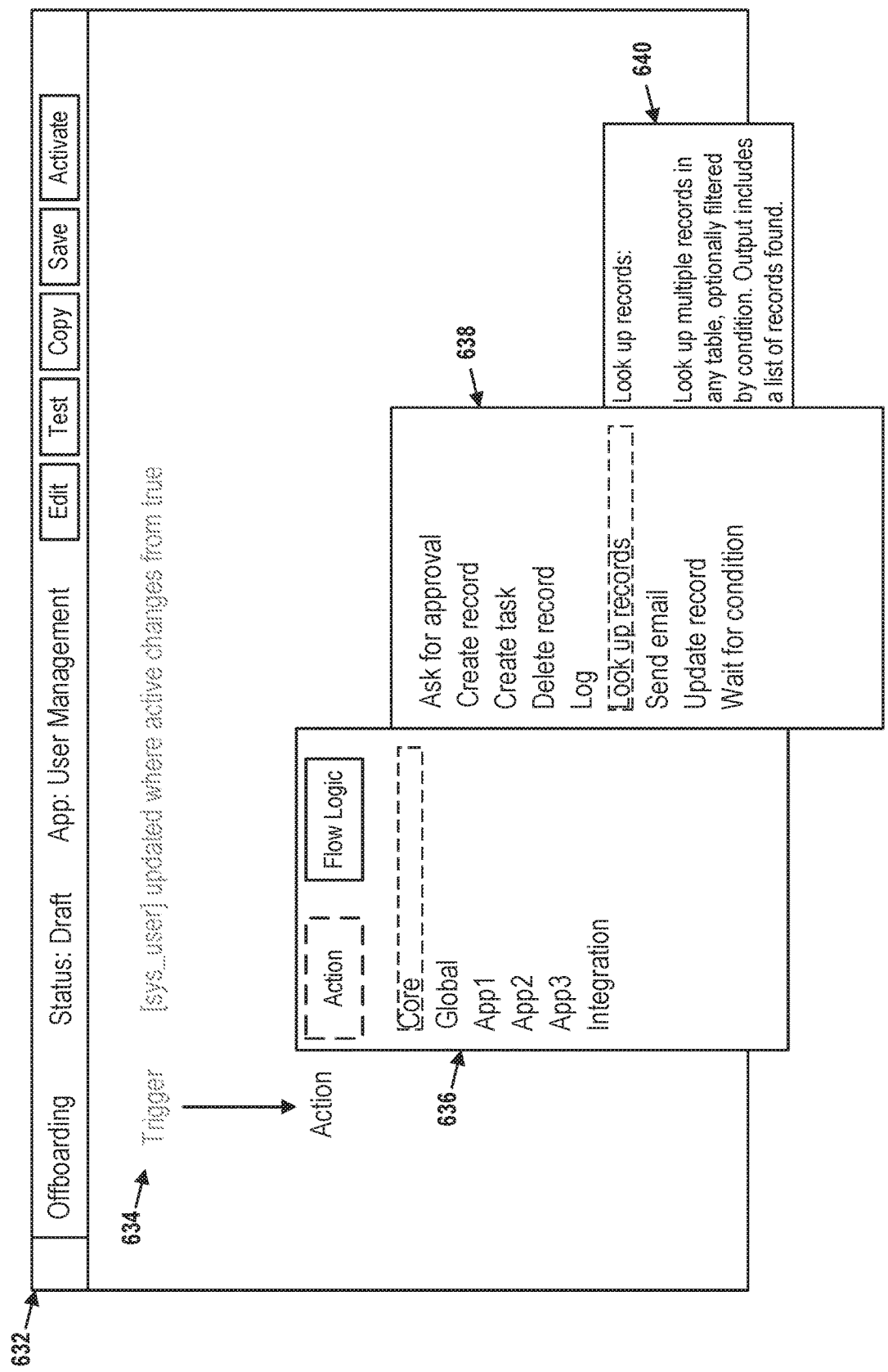

FIG. 6D depicts the first part of an action specification in GUI 632. Notably, at 634, the word "Trigger" is accompanied by a description of the trigger specified in FIGS. 6B and 6C. Further, this text is grayed in order to indicate that the trigger is no longer being specified.

As shown in menu 636, the user has the option of specifying an action or flow logic. The dashed line around the "Action" button indicates that an action is being specified. Particularly, menu 636 displays several contexts for the action being specified. For example, "Core" actions are supported by the computational instance as a default, while "Global" actions include all core actions, application-based, and integration-based actions. Application-based actions, "App1", "App2", and "App3", are actions supported by respective applications built on top of the remote network management platform. These may include, for example, various types of IT service management, IT operations management, customer service management, security operations, and CRM applications. Integration-based actions include actions defined by or supported by third-party applications integrated with the remote network management platform. These may include, for example, virtual chat applications, messaging applications, and so on. Each of these built-in or third-party applications may explicitly expose interfaces (referred to as "spokes") to the workflow design tool so that the workflow design tool can support workflows including data and/or functionality of these applications.

In FIG. 6D, the user has selected the "Core" context. Based on this selection, sub-menu 638 is displayed. This sub-menu provides the user the ability to select from a number of specific actions, such as "Ask for approval", "Create record", "Create task", "Delete record", "Log", "Look up records", "Send email", "Update record", and "Wait for condition". From these, the user has selected "Look up records". Accordingly, information box 640, that describes the selected action, may be displayed.

Figure 6E:
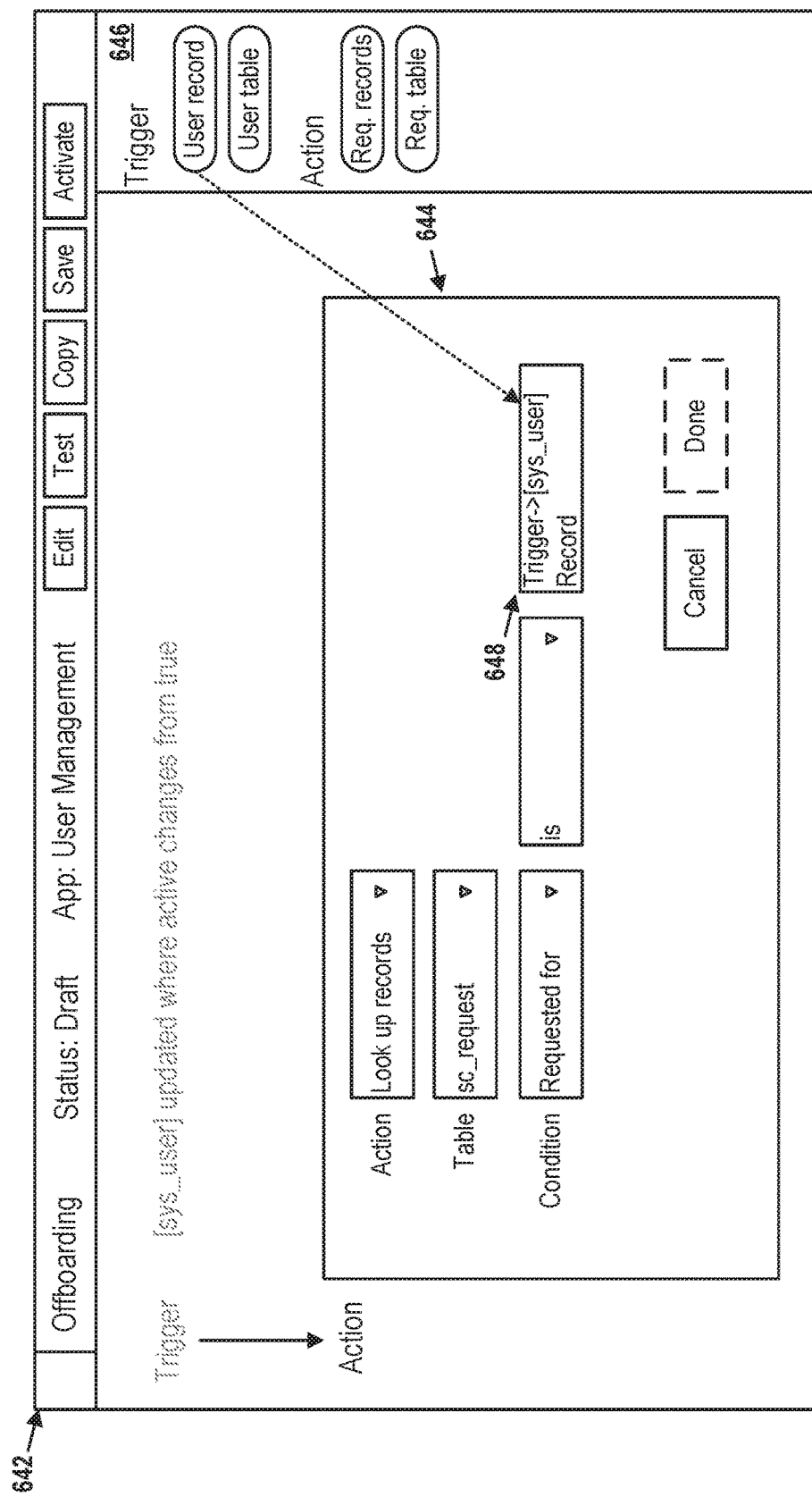

FIG. 6E depicts the second part of the action specification in GUI 642. Pop up window 644 (which, like window 606, may be a pane overlaid on top of GUI 642 and not a separate window), may allow specification of a table in which to look up records and the conditions that these records must meet. As shown in window 644, the action (as specified in FIG. 6D) is to look up records, and the table in which to perform this look up is sc_request (a table that contains catalog requests made by users). The records returned from sc_request are those where the "Requested for" field matches the user identified in the trigger step (i.e., a user whose active status has changed).

FIG. 6E also depicts column 646 containing pill-shaped user interface elements ("pills") arranged according to the previously-defined trigger as well as the action currently being defined. These pills are capable of being dragged from column 646 to the rightmost selectable item 648 in the condition field, as shown by the dotted arrow. User interface pills in this context are typically oval-shaped items that refer to data previously specified in the workflow and may be automatically placed in the user interface as this data is specified in the workflow design tool. In some embodiments, user interface chips or tags (with various shapes) may be used instead.

Notably, the two pills under the "Trigger" heading in column 646 refer to the user record(s) returned by the trigger (e.g., an entry in sys user that changed from active to another state as specified in FIG. 6C) and the table upon which the trigger operates (e.g., sys user as specified in FIG. 6C). The two pills under the "Action" heading in column 646 refer to the records found by the action being defined in FIG. 6E, as well as the table in which these records are located (e.g., sc_request).

The user interface elements, such as the pills in column 646, are a significant convenience for the user specifying the workflow, as they allow the user to easily include a reference to data or tables previously specified or referred to in the workflow. In this way, the user does not need to type in a specific reference to this information, and need only drag and drop a pill instead.

Once the user is satisfied with the information entered in window 644, the user may select or otherwise activate the "Done" button. This selection is denoted in FIG. 6E by this button being depicted with a dashed line. Once the user completes the dialog of window 644, the next phase of the workflow design tool, which allows the user to specify flow logic for the action, may be displayed.

Figure 6F:
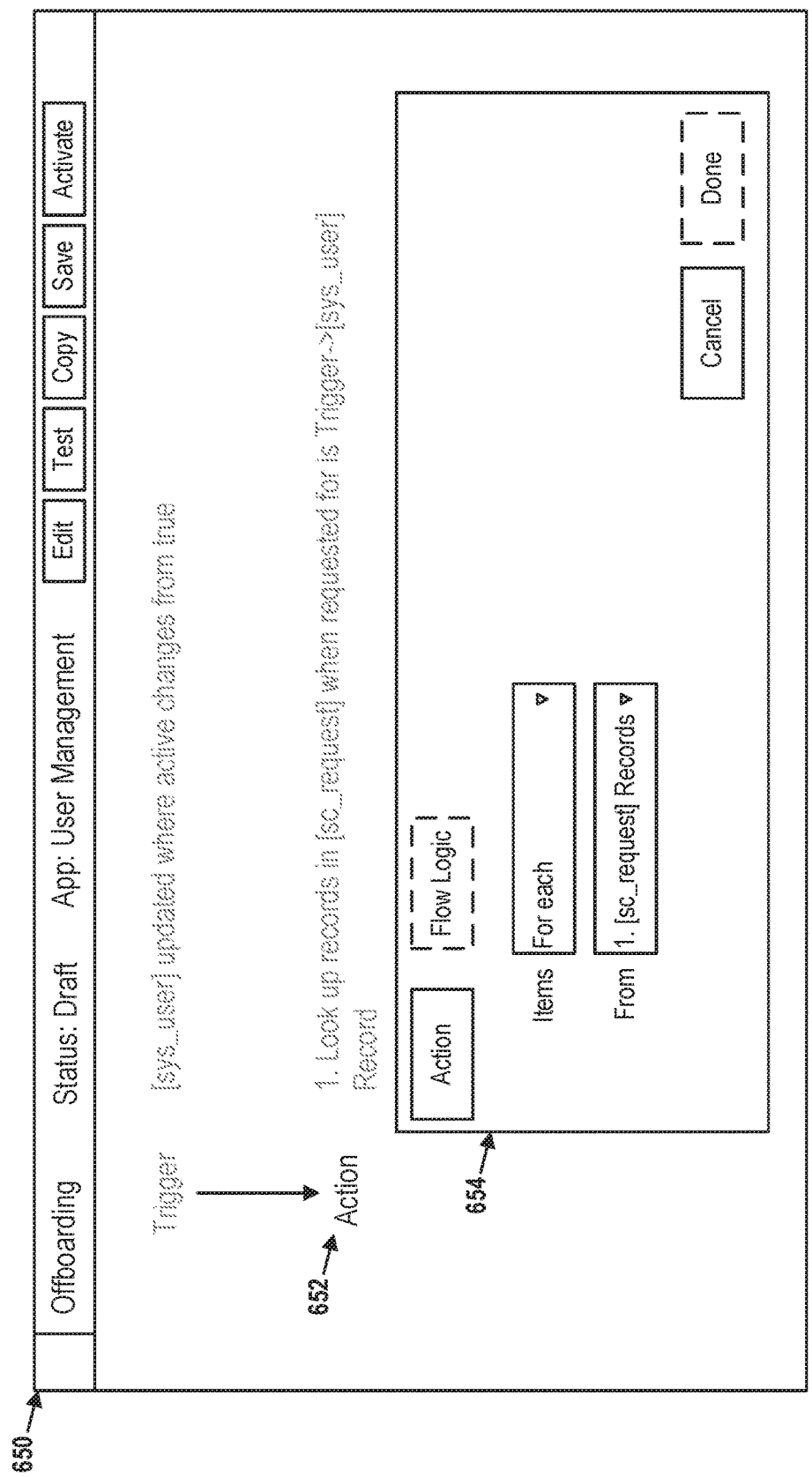

FIG. 6F depicts flow logic specification in GUI 650. Flow logic may be tied to an action, and specifies how the action is to be carried out. Notably, at 652 the word "Action" is annotated with a description of the action specified in FIGS. 6D and 6E.

Pop up window 654 may allow specification of whether the workflow operates on some or all items returned by the action specified in FIGS. 6D and 6E. The "Flow Logic" button is depicted with a dashed line to show that flow logic, rather than an action, is being specified. In this case, the selections made in window 654 indicate that the workflow operates on all items returned from the query specified in FIG. 6E. Notably, the "1. [sc_request] Records" value in the "From" field of window 654 indicates that the flow logic is to be applied to the output of Action 1, specified at 652. Notably, the value of the "From" field may be populated by a pill dragged and dropped from a column containing such pills. This column is not shown in FIG. 6F for purposes of simplicity, but may resemble column 646 of FIG. 6E.

Once the user is satisfied with the information entered in window 654, the user may select or otherwise activate the "Done" button. This selection is denoted in FIG. 6F by this button being depicted with a dashed line. Once the user completes the dialog of window 654, the next phase of the workflow design tool, which allows the user to specify a sub-action for the flow logic, may be displayed.

Figure 6G:
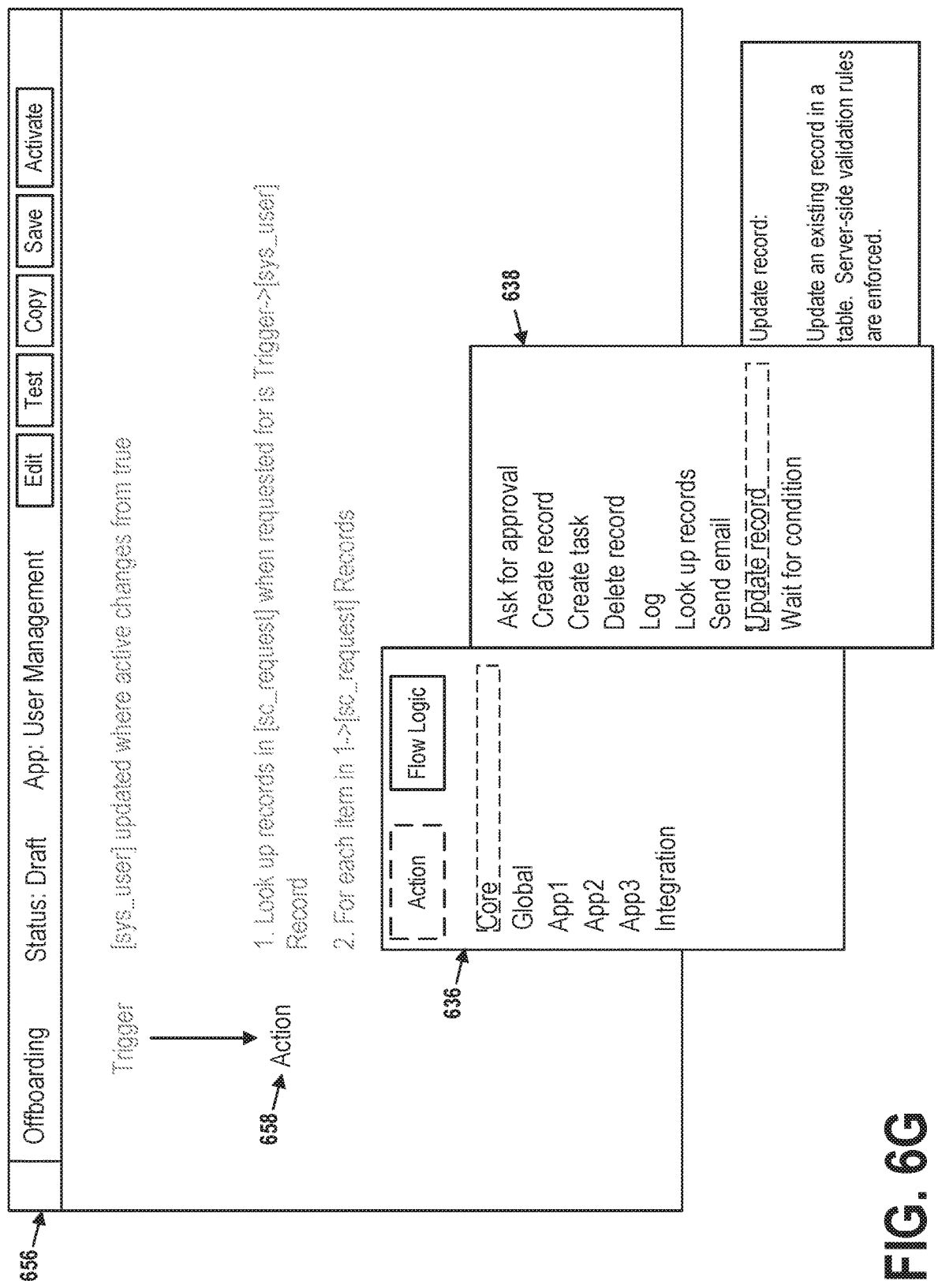

FIG. 6G depicts a sub-action specification in GUI 656. Notably, at 658, the word "Action" is accompanied by an updated description of the action and flow logic specified in FIGS. 6D, 6E, and 6F. Further, this text is grayed in order to indicate that the flow logic is no longer being specified. Notably, the sub-action specification once again displays menu 636 and sub-menu 638, this time with "Core" and "Update record" selected. Thus, GUI 656 depicts the user specifying that records will be updated for each item returned by the action defined in FIGS. 6D and 6E.

Figure 6H:
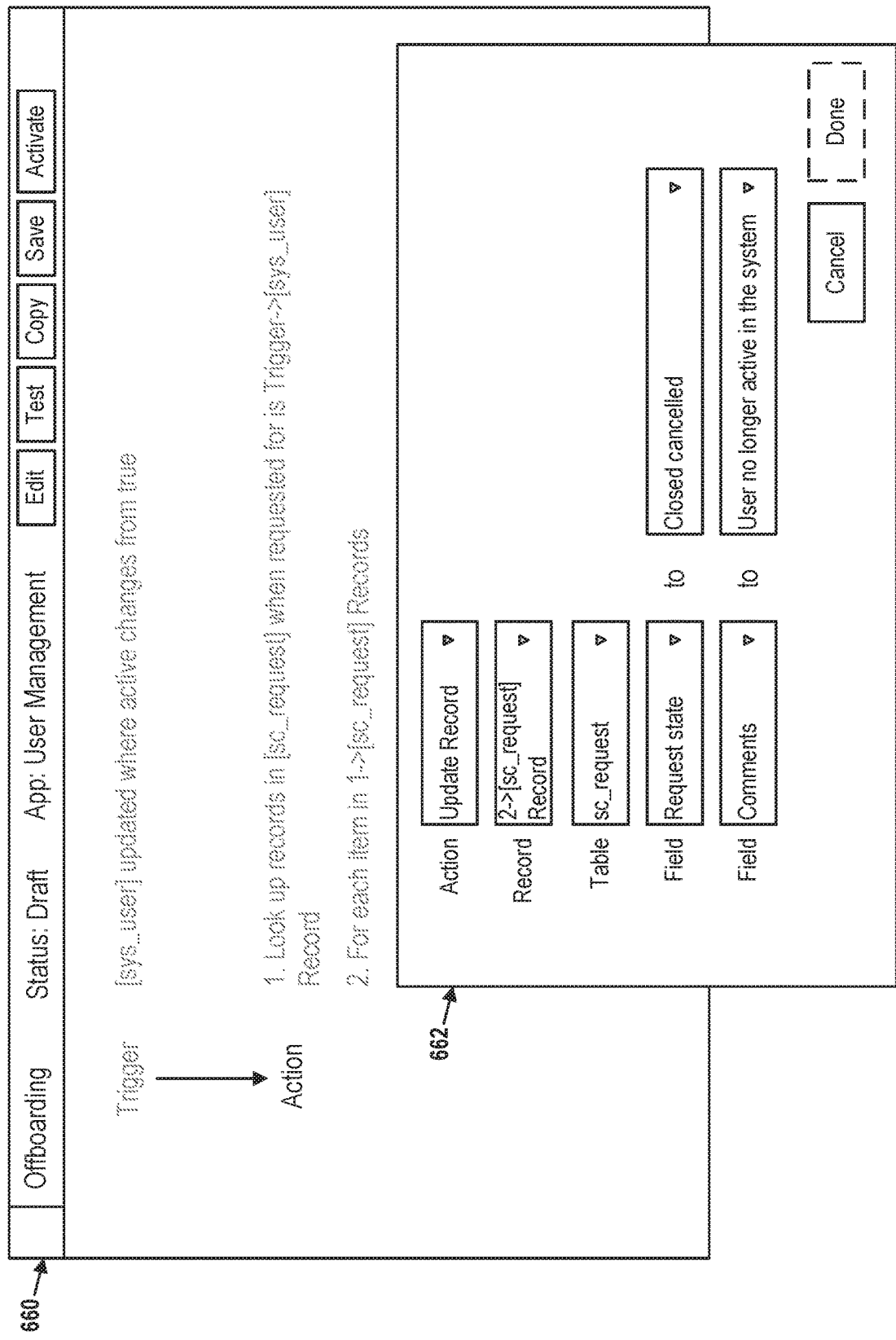

FIG. 6H continues this sub-action specification in GUI 660. Pop up window 662, may allow specification of actions to be taken on items returned by the flow logic specified in FIG. 6F. Particularly, the options shown in window 662 indicate that, for each record in the sys user table that is returned by the trigger, any record in the sc_request table that was requested for the same user will be updated. The user also specifies two fields that are to be updated for matching records. The "Request state" field is to be updated to "Closed cancelled" to cancel the departed employee's pending catalog requests. The "Comments" field is also updated to "User no longer active in the system" to indicate why the request was cancelled.

Notably, the value of the "Record" field may be populated by a pill dragged and dropped from a column containing such pills. This column is not shown in FIG. 6H for purposes of simplicity, but may resemble column 646 of FIG. 6E.

Once the user is satisfied with the information entered in window 662, the user may select or otherwise activate the "Done" button. This selection is denoted in FIG. 6H by this button being depicted with a dashed line.

Figure 6I:
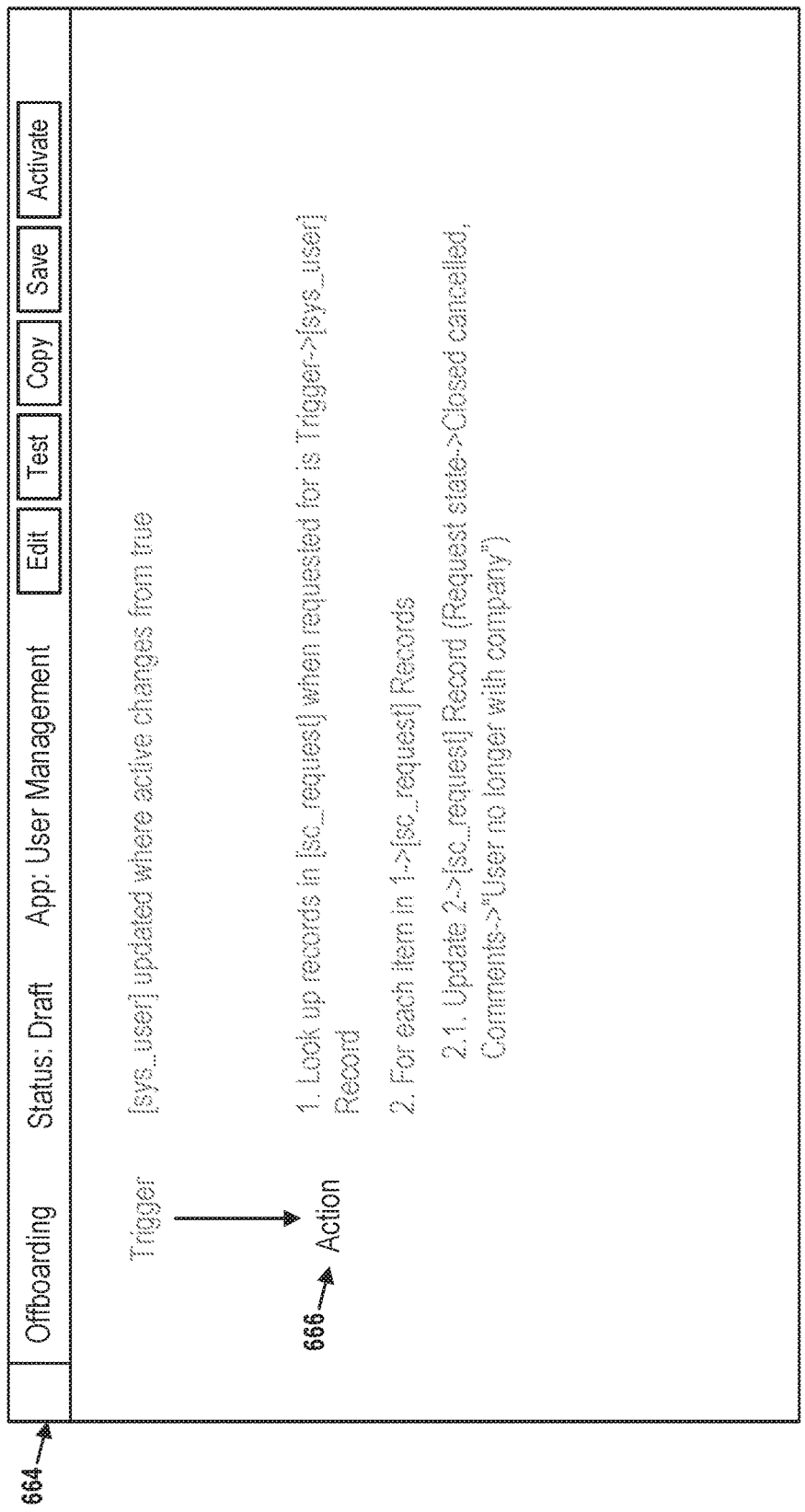

FIG. 6I shows GUI 664 depicting the workflow defined so far. At 666 the action specified in FIGS. 6D, 6E, 6F, 6G, and 6H is displayed. It is broken down into steps 1 (looking up records in the sc_request table that were requested for the employee identified by the trigger), 2 (for each these records, performing step/sub-action 2.1), and 2.1 (updating these records by closing them and adding an appropriate comment).

Figure 6J:
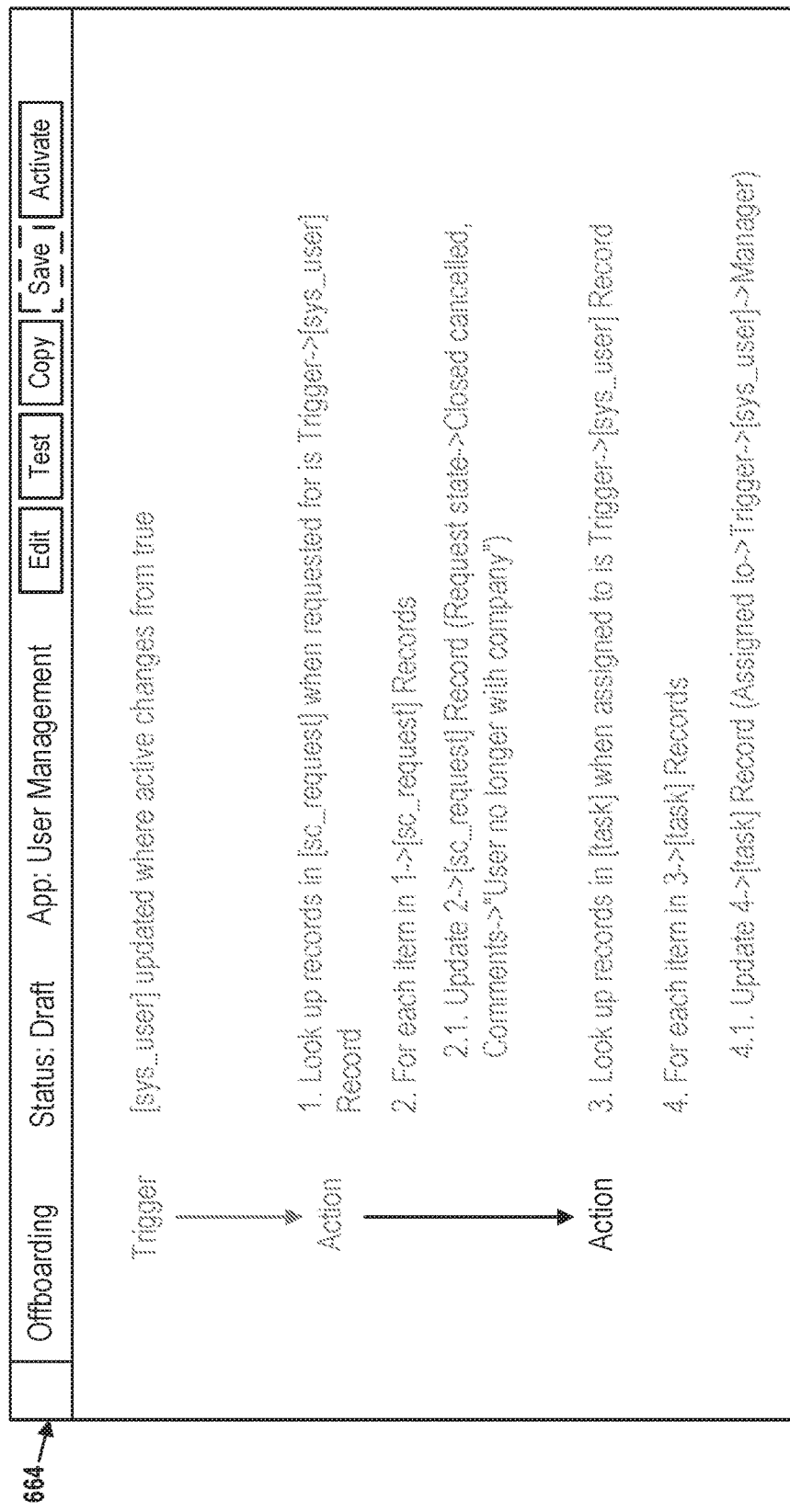

The rest of the desired workflow, as introduced above, also involves reassigning all tasks assigned to the departed employee to that person's manger. This further step is depicted in FIG. 6J. In order to avoid a degree of repetition, the GUIs for specifying the action, the flow logic, and the sub-action for task reassignment are omitted. Instead, FIG. 6J depicts GUI 664 updated to show the complete workflow.

Notably, step 3 looks up records in the task database table (which contains entries for tasks to be carried out by employees) that are assigned to the employee identified by the trigger. Step 4 specifies flow logic that, for each of these records, indicates that step/sub-action 4.1 is to be performed. Step 4.1 indicates that, for each record identified in step 4, the "Assigned to" field is to be changed to the manager of the identified employee.

In this way, arbitrarily complex flow-chart-like workflows can be rapidly designed in a data-centric fashion. The designer need not write any code, and is guided through the workflow specification by a series of GUIs that help the designer with appropriate menus and other interface elements. As a result, the designer saves a significant amount of time. In practice, experiments have shown that workflows can be specified in hours rather than the days typically needed for manually coding the workflows in a high-level programming language (e.g., JAVA®, JAVASCRIPT®, C++, and so on).

Another benefit of this workflow design tool is that it allows a workflow to be tested by the same GUI prior to deployment. FIG. 6K shows GUI 668, which contains the same information as GUI 660 from FIG. 6J, but also includes three columns reflecting the outcome of such a test. The "State" column indicates whether each step has been completed (in this example, all steps were completed), the "Start time" column indicates the time at which each step began, and the "Duration" column indicates how long each step took to be performed, in milliseconds. This allows the designer to verify that each step is properly performed, as well as to identify any steps that take an inordinate amount of time to complete. In alternative embodiments, other information may be displayed.

VI. EXAMPLE API SPECIFICATION

Some workflows may utilize functions (e.g., web services) provided by third-party computing systems. In many cases, these functions may be provided by way of APIs, or other remote interfaces, maintained by the third-party computing systems. A workflow may interact with an API by transmitting thereto a web-based request (e.g., an HTTP request), in response to which the API may provide an output of the function (e.g., in the form of an HTTP response). Specifically, for each API or function thereof, a corresponding action may be defined that can be integrated into the workflow. The action may collect the inputs of the function, generate the request, receive the response, and parse the response to extract therefrom the output of the function to be used in one or more later actions of the workflow. Defining an action to represent a function of an API thus facilitates the incorporation of the API's functions into workflows.

In some cases, generating such actions may be done manually by way of a user interface provided by an action definition software application. Namely, manual definition of an action that invokes a function of an API may involve manually reviewing documentation (e.g., text in human-readable format) of the API, identifying the inputs and outputs of the function of the API, determining how (e.g., the format and protocol) the API expects the inputs to be provided thereto, determining how the API provides the outputs, and determining the data types of the inputs and outputs, among other operations. Such manual definition may also include configuring the action to adhere to each of the determinations made above.

Since APIs and the functions thereof may differ from one another, supporting each new API may involve dedicating additional programmer time and effort to write program code to access the new API. Such manual definition of actions may be error-prone. Thus, this manual approach might not be efficiently scalable for large numbers of APIs, and therefore may limit an enterprise's ability to take full advantage of the multitude of available APIs.

Accordingly, the action definition software application may also be configured to assist with and/or guide the manual definition of the actions, and/or automatically define the actions that invoke functions of APIs. The action definition software application may use a programmatic specification of the API (e.g., text in machine-readable format) to determine its functions, the functions' respective inputs and outputs, and how to provide and receive these inputs and outputs, respectively, to integrate the functions into a workflow. By defining the actions automatically, or at least providing guidance during manual definition, the action definition software application reduces the amount of programmer involvement needed to support a large number of APIs, while nevertheless allowing programmers to retain control over generation of actions. Accordingly, the action definition software application allows a large number of API functions to be made available as actions in a shorter amount of time and with fewer errors, if any.

FIGS. 7A, 7B, 7C, and 7D illustrate excerpts 700, 702, 704, and 706, (i.e., excerpts 700-706) respectively, of an example API specification that may be used by the action definition software application to define actions that invoke execution of the API's functions. The API specification may be provided, for example, by the third-party computing system that develops, maintains, and hosts the API. Specification excerpts 700-706 are written according to the third version (3.0.0) of the OPENAPI specification standard, as indicated by line 1 of excerpt 700. The OPENAPI specification defines a format for describing representational state transfer (REST) APIs. Notably, however, the action definition software application may be configured to support APIs built according to standards, platforms, or protocols other than those associated with REST (e.g., GRAPHQL, ODATA), as well as API specification formats other than OPENAPI (e.g., RAML).

The API specification may be structured hierarchically and this hierarchy may be indicated by way of indentations, or nesting, of the tags and their respective values. For example, the tags "TITLE" in line 3, "DESCRIPTION" in line 4, and "VERSION" in line 5 are shown indented relative to the tag "INFO" in line 2, and are thus children of the parent tag "INFO." Such a hierarchical structure facilitates parsing of the API specification by the action definition software application to identify therein the different attributes of the API functions. Notably, while excerpts 700-706 are shown written in YAML Ain't Markup Language (YAML), excerpts 700-706 could alternatively be written in another format such as, for example, JavaScript Object Notation (JSON).

The API specification may provide general, bibliographic information (e.g., metadata) regarding the API, as indicated by line 2. This general information may include a title of the API, indicated on line 3 as "Sample API," a description of the API's purpose, indicated on line 4 as "This API performs function 1, function 2, . . . ," and a version of the API, indicated on line 5 as 1.0.5. Notably, a corresponding action may be defined for each version of the API, or at least each version accompanied by a breaking change to the API. A breaking change may be one that changes the inputs thereof, the outputs thereof, the format of the inputs and/or outputs, or removes functions, among other possibilities.

The API specification may additionally indicate one or more servers associated with the API, as indicated by line 7. Specifically, the one or more servers may be indicated by corresponding base URLs that addresses these servers. For example, a production server of the API may be addressed by the URL "http://api.example.com/v1", as indicated by lines 8 and 9, while a staging server used for testing purposes may be addressed by the URL "http://staging-api.example.com", as indicated by lines 10 and 11. These base URLs may be modified by the action definition software application to include therein parameters that cause the respective server devices to invoke the functions of the API.

Namely, the API specification may indicate what parameters may be included in the URL to access particular functions of the API, as well as how these parameters are to be included. As one example, line 13 indicates a URL resource path and a resource path parameter that may be added to the base URL to access one function of the API. By sending an HTTP GET request, as indicated by line 15, to "http://api.example.com/v1/users/{user_id}", as indicated by line 14, a workflow may request from the API data associated with a user associated with the value specified for "user_id." In this case, "users/{user_id}" represents a resource path, while the value substituted for "user_id" represents a resource path parameter. Notably, line 18 of excerpt 700 specifies that the value of "user_id" is to be provided as a resource path parameter.

Excerpt 700 further specifies that the value of "user_id" is a required input for the function to be executed, as indicated by line 20. Line 22 indicates the schema, or structure and attributes, of "user_id." Namely, "user_id" is an integer data type and has a minimum value of 1, as indicated by lines 23 and 24, respectively. Accordingly, in order to request data associated with a user assigned user_id of 5, the workflow may transmit an HTTP request to "http://api.example.com/v1/users/5".

Excerpt 700 also defines attributes of the HTTP response that the API will transmit and the workflow may receive in response to the HTTP request, as indicated by line 25. Namely, one possible response is "200" representing the "HTTP 200 OK" standard response code, which indicates a successful request and response. Another possible response is "404" representing the "HTTP 404 NOT FOUND" standard response code which indicates that the requested resource was not found on the server (e.g., a user associated with the value of user_id included in the request does not exist).

While a "404" response might not contain additional information beyond the status code itself, a "200" response may also include the requested data in a particular format, as specified by lines 27-38. Namely, the response may include a JSON object that contains an integer value associated with the requested user (e.g., this may be the same value as specified in the request URL for "user_id") and a string that represents the name of the requested user (e.g., "Jane Doe"). Excerpt 700 thus generally informs the action definition software application of how the corresponding API function behaves, thereby allowing an action to be defined that successfully invokes this function. Notably, the API function described by excerpt 700 is simplistic for illustrative purposes. The API specification may, however, define functions that accept a greater number and different types of inputs, and generate a greater number and different types of outputs than shown in excerpt 700.

FIG. 7B illustrates excerpt 702 of the API specification that defines an additional function of the API which accepts as input a query parameter. The additional function is configured to return data associated with users that are part of "user_group" and are assigned a particular status (e.g., active or inactive), as indicated by line 3. As indicated by lines 1-2, the additional function is invoked by transmitting an HTTP GET request to "http://api.example.com/v1/users/{user_group}/get_user_by_status". The API expects to receive as input (i) an integer path parameter "user_group" that specifies the group in which to search for the users, as indicated by lines 5-10, (ii) a string query parameter "status" that specifies the status of the users to be retrieved, as indicated by lines 11-15, and (iii) an integer query parameter "limit" that specifies the maximum number of results to return in one response, as indicated by lines 16-22.

A query parameter is a key-value pair appended at the end of a URL in the following format: "http://example.com/resource_path?key_1=value_1&key_2=value_2". Thus, excerpt 702 specifies that a request for users in group 5 that are active, and where the response is to include up to a maximum of 25 results, should be addressed to "http://api.example.com/v1/users/5/get_user_by_status?status=active&limit=25". Notably, the API specification may indicate default values for some inputs that are not required. Thus, for query parameters "limit," excerpt 702 indicates at line 18 that this input is optional (i.e., required: false) and line 21 indicates that, when a value for this input is not provided, a default value of 20 is assigned thereto.

Excerpt 702 further indicates that the function specified thereby returns a response with either a "200" or "404" status code. The "200" response includes therein a JSON object that includes, for each respective user identified by the request, (i) an integer value of an id associated with the respective user, (ii) a string representing the name of the respective user, (iii) a string representing the status of the respective user (e.g., this could be the same string as input "status"), and (iv) an integer value of an id of the group with which the user is associated (e.g., this could be the same value as input "group").

FIG. 7C illustrates excerpt 704 of the API specification that defines HTTP header parameters that may be provided to a function of the API. Namely, another example function of the API identified by the resource path "/ping" may be configured to allow the workflow to use an HTTP GET request to check if the API server is alive (i.e., actively operating), as indicated by lines 1-4. This function of the API may require as input an HTTP header parameter "X-Request-ID" provided as a string formatted as a universally unique identifier (UUID), as indicated by lines 5-11. The function may generate an output that is included in a corresponding HTTP response. This output may be indicated by the API specification in a manner similar to that shown in excerpts 700 and 702.

Similarly, FIG. 7D illustrates excerpt 706 of the API specification that defines HTTP cookie parameters that may be provided to a further example function of the API. Namely, the further example function of the API identified by the resource path "/users" may be configured to allow the workflow to use an HTTP GET request to retrieve all users known to the API while using a cross-site request forgery (CSRF) token, as indicated by lines 1-4. This function of the API may require as input an HTTP cookie parameter "debug" provided as an integer having a value of either 0 or 1, as indicated by lines 6-11. This function of the API may also accept as input an HTTP cookie parameter "csrf_token" provided as a string, as indicated by lines 12-15. The function may generate an output that is included in a corresponding HTTP response. This output may be indicated by the API specification in a manner similar to that shown in excerpts 700 and 702.

The API specification may additionally define a plurality of other possible aspects of the API. For example, the API specification may define authentication standards or procedures followed by the API, various other media types (e.g., XML, form data, portable document format (PDF), and various image formats) that can be provided as input to or receives as output from functions of the API, deprecated functions, options for providing parameters to the API in a serialized fashion (e.g., providing a query parameter that associates multiple values with a single key), callback URLs used by one or more functions of the API, links, and specification extensions, among other possibilities. In the case of OPENAPI 3.0.0, for example, the API specification may define any other aspects of the API that are provided for in the OPENAPI specification standard and/or utilized by the API.

VII. EXAMPLE ACTION DEFINITION USER INTERFACE

Figure 8A:
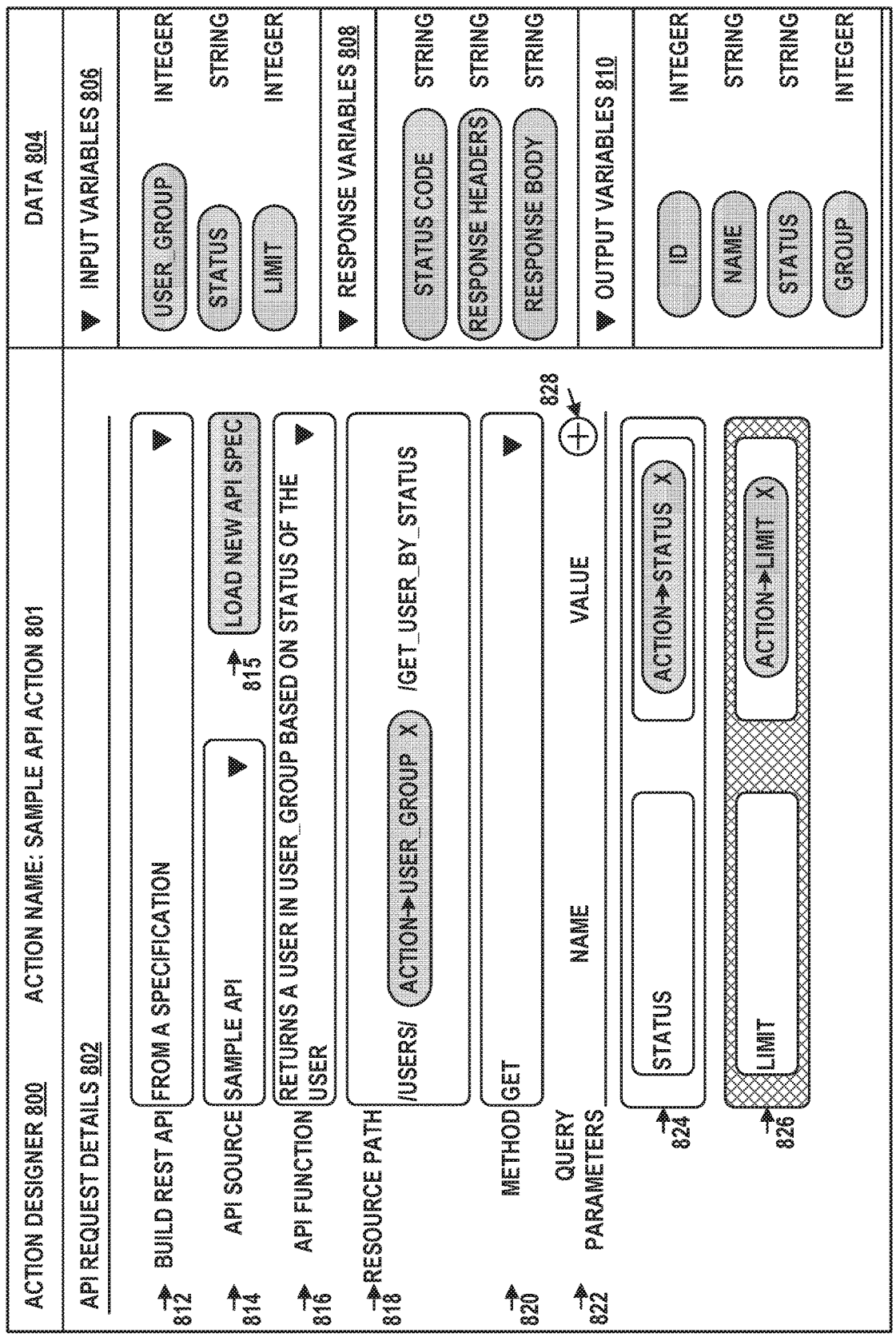
FIG. 8A depicts an action design tool graphical user interface, in accordance with example embodiments.

FIG. 8A illustrates an example user interface that may be involved in defining an action based on an API specification. Specifically, action designer 800 may be a user interface provided by the action design software application to facilitate definition of an action that invokes one or more functions of an API. Action designer 800 includes API request details 802 for the action and data 804 used by the action. Data 804 includes input variables 806, response variables 808, and output variables 810. Notably, request details 802 and data 804 may be automatically populated by the action design software application based on the API specification, with little to no manual input from a programmer.

Action designer 800 is shown in FIG. 8A as implementing a configuration of sample API action 801 that invokes the function illustrated by excerpt 702 (shown in FIG. 7B) of the API specification. That is, the content of API request details 802 and data 804 is based on the definitions of attributes of the API function specified by excerpt 702. However, action designer 800 may be similarly configured to implement actions that invoke other functions of the API based on other excerpts or portions of the API specification.

API request details 802 include drop-down box 812 that provides for selection of a source of the attributes and/or definition of the API. For example, attributes of the API may be provided by the API specification (e.g., excerpts 700-706), as shown in FIG. 8. The API specification may be provided to the action definition software application by way of a target URL that addresses a server device that provides the API specification and, in some cases, hosts aspects of the API. The action definition software application may thus be configured to retrieve the specification by way of the target URL from the server device. Alternatively or additionally, the API specification may be provided to the action definition software application as a file retrieved from local or network storage, or as text input. Regardless, action designer 800 may provide an additional user interface (not shown) that includes one or more input fields into which the target URL, the system file path, or the text of API specification may be provided by a user generating the action.

Alternatively or additionally, one or more attributes of the API may be provided manually by a user generating the action. In one example, the definition of the action may be generated automatically by the action definition software application based on an API specification, and later manually modified by a user. In another example, an API specification might not be involved in the generation of the action. Instead, the user may manually specify the contents of each of API request details 802 and data 804, rather than relying on the action design software application to do all this automatically based on the API specification. Thus, drop-down box 812 may include a "Manually" option. Although a manual option is provided, automatic or guided generation of the action may nevertheless be faster and less error-prone.

When drop-down box 812 is used to indicate that the action is to be built from a specification, action designer 800 may provide (e.g., responsively display) drop-down box 814 that allows for selection of a source of the API. The source of the API may generally specify the API to be used by the action, rather than specifically indicating the individual functions made available by this API. When action designer 800 is first used, drop-down box 814 might not provide any candidate API sources. Instead, button 815 may be used to load a new API specification from a target URL or from text input.

Based on or in response to providing an API specification to action designer 800, the action design software application may be configured to parse the API specification to identify therein the attributes of the API. Namely, the action design software application may be configured to identify at least (i) bibliographic information (e.g., metadata) associated with the API (e.g., API title, version, description, etc.), (ii) the functions made available by the API, (iii) the inputs of the functions, and (iv) the outputs of the functions. After one or more API specifications are provided to action designer 800 and parsed by the action design software application, these specifications may be stored for later use and thus provided as API source options by drop-down box 814. Notably, drop-down box 814, as shown in FIG. 8, indicates that "Sample API" is selected as the API source for this action. The name "Sample API" is defined based on line 3 of excerpt 700 of the API specification imported by action designer 800 as part of definition of the action.

Drop-down box 816 provides for selection of a specific one of the functions made available by the API selected in drop-down box 814. Thus, when the API corresponding to excerpts 700-706 is selected in drop-down box 814, drop-down box 816 may provide at least "Returns a user by ID" (lines 14-40 of excerpt 700), "Returns a user in user_group based on status of the user" (lines 1-42 of excerpt 702), "Checks if the server is alive" (lines 2-11 of excerpt 704), and "Retrieves all users while using a CSRF token" (lines 2-15 of excerpt 706) as candidate functions that can be used by the action. FIG. 8A illustrates a selection of the "Returns a user in user_group based on status of the user" (lines 1-42 of excerpt 702) function of the API.

Based on or in response to selection of a particular API function in drop-down box 816, the action design software application may be configured to automatically populate the remaining sections of API request details 802 and data 804 to define the action's usage of the particular API function. That is, the action design software application may be configured to define the action's usage of the selected API function without additional manual configuration of the action.

Specifically, the action design software application may be configured to generate input variables 806 that correspond to the inputs of the API function defined by the API specification. Input variables 806 include "user_group" corresponding to the input path parameter specified in lines 5-10 of excerpt 702, "status" corresponding to input query parameter specified in lines 11-15 of excerpt 702, and "limit" corresponding to input query parameter specified in lines 16-22 of excerpt 702. Input variables 806 may be exposed by the action (e.g., made available as variables in a workflow) such that values from other actions may be assigned to input variables 806 when sample API action 801 is integrated into a workflow.

The action design software application may also be configured to generate output variables 810 that correspond to the outputs of the API function defined by the API specification. Output variables 810 include "ID" corresponding to the output specified in lines 31-32 of excerpt 702, "name" corresponding to the output specified in lines 33-35 of excerpt 702, "status" corresponding to the output specified in lines 36-38 of excerpt 702, and "group" corresponding to the output specified in lines 39-40 of excerpt 702. Output variables 810 may be exposed by the action such that values of variables 810 may be assigned to input variables of other actions when sample API action 801 is integrated into a workflow.

The action design software application may further be configured to generate response variables 808 that store the HTTP response transmitted by the API. Response variables 808 include "Status Code" which stores the HTTP status code of the API response (e.g., line 24 or 41 of excerpt 702), "Response Headers" which stores the HTTP headers of the API response, and "Response Body" which stores the HTTP body of the API response. Other response variables may be generated to store other portions or aspects of the API response.

Depending on the implementation, response variables 808 may or might not be directly exposed by the action such that values of variables 808 may be assigned to input variables of other actions when sample API action 801 is integrated into a workflow. In one implementation, response variables 808 may be exposed such that other actions within a workflow can view and operate on the entire HTTP response of the API. In another implementation, however, rather than being directly exposed in their raw form (e.g., as an HTTP header, an HTTP body containing HTML or JSON strings, etc.), response variables 808 may instead be parsed during execution of the action to extract therefrom the values of output variables 810. The contents of response variables 808 may thus be partially exposed for use by other actions by way of output variables 810.

To that end, the action definition software application may determine a mapping between the API response and output variables 810. This mapping may indicate which portions of the API response represent and/or contain the output values of the function, and thus dictates how output variables 810 should be populated based on the API response. Since different portions of the API response may be stored in different ones of response variables 808, this mapping thus also indicates a relationship between response variables 808 and output variables 810.

The action definition software application may also determine a mapping between input variables 806 and various parameters of the API function, including resource path parameters, query parameters, HTTP header parameters, HTTP body parameters, and HTTP cookie parameters, among other possibilities. This mapping may indicate the manner in which the action is to provide the values of input variables 806 to the API function. One or more of API request details 802 may be populated based on this mapping.

For example, the mapping may indicate that the value of the "user_group" input variable is to be provided to the API function as a resource path parameter, as dictated by the API specification at lines 5-6 of excerpt 702. Thus, resource path 818 may be populated with the "Action→user_group" pill to visually indicate that the value of the "user_group" input variable will be provided to the API function as a resource path parameter. While the "Action→user_group" pill may be manually dragged and placed in resource path 818 by a user defining the action, this operation may be carried out automatically by the action definition software application (e.g., to provide a suggested placement of the pill in view of the API specification). Notably, the "X" in each pill allows the pill to be deleted from API request details 802.

When the action is integrated into a workflow and executed, the value assigned to "user_group" input variable will be included in the URL used to invoke execution of the API function. For example, when "user_group" is equal to 10, the path "/users/{user_group}/get_user_by_status" will be appended to the base URL "http://api.example.com/v1" and the resource path parameter {user_group} will be replaced by "10", thus forming the URL "http://api.example.com/v1/users/10/get_user_by_status". This URL may be further modified to include therein query parameters defined by the API specification.

Drop-down box 820, which specifies the HTTP method (e.g., GET, POST, DELETE, etc.) used to access the particular API function, may be populated by the action design software application based on or in response to selection of the particular API function in drop-down box 816. In FIG. 8, drop-down box 820 indicates that the GET method is used to invoke the selected function, as dictated by line 2 of excerpt 702.

The mapping may also indicate that the values of the "status" and "limit" input variables are to be provided to the API function as query parameters, as dictated by excerpt 702 at lines 11-12 and 16-17, respectively. Accordingly, API request details 802 may include query parameters section 822 that defines key-value pairs 824 and 826 for the "status" and "limit" query parameters, respectively. Namely, query parameter pair 824 may include the key "status" to which the value of the input variable "status" is mapped, as indicated by the "Action→status" pill. Similarly, query parameter key-value pair 826 may include the key "limit" to which the value of the input variable "limit" is mapped, as indicated by the "Action→limit" pill.

Query parameters may be provided to an API by being appended to a URL after the resource path and resource path parameters thereof. Thus, for example, when "status" is set to "active" and "limit" is set to 15, the query parameters may be "status=active" and "limit=15". The URL "http://api.example.com/v1/users/10/get_user_by_status" may be modified to include therein these query parameters by appending them to the end of this URL. Accordingly, a complete modified URL used to invoke the API function shown in FIG. 8A may be "http://api.example.com/v1/users/10/get_user_by_status?status=active&limit=15". When sample API action 801 is executed, this action may generate the modified URL to include therein the values of the input variables of the action in the manner specified by the API specification and the action definition illustrated in FIG. 8.

Action designer 800 may visually indicate whether a particular input variable is required or optional. For example, key-value pair 826 in query parameters section 822 is shown against a hatched background to indicate that the corresponding input is optional, as indicated by line 18 of excerpt 702. All other input fields of API request details 802 may be shown as having a white to indicate that these inputs are required by the API function. It may be assumed for the purpose of this example that an input is required unless indicated otherwise by the API specification. In other implementations, however, whether a particular input is required or optional may be visually indicated in other ways. For example, the names of required inputs may be followed by an asterisk.

Notably, aspects of sample API action 801 may be manually modifiable. For example, while the action design software application generates and populates the fields of API request details 802 according to the API specification, the fields, the names thereof, and the variables assigned thereto may be manually modified. Namely, since the "limit" query parameter is an optional input, the corresponding pill may be deleted from query parameter key-value pair 826 by a designer of this action. Similarly, button 828 may be used to add additional query parameter key-value pairs to be provided as inputs to the function (e.g., when one or more of the inputs are not defined by the API specification but are nevertheless accepted by a function thereof). Other modifications are possible.

Although action 801 may be modifiable, such modification might not be necessary to allow for successful execution thereof. That is, the action design software application may automatically generate a complete version of the action that can be integrated into a workflow.

Additionally, for API functions that take HTTP header, HTTP body, HTTP cookie parameters, and/or other parameters as input, API request details 802 may include additional corresponding sections that indicate the mapping between these parameters and one or more of the input variables of the action. For example, in the case of the function specified by excerpt 704, API request details 802 may include an HTTP headers section in place of query parameters section 822. For each HTTP header, the section may include a key field and a corresponding value field. A pill representing the input variable "x-request-id" may be assigned to a value field corresponding to the key of the HTTP parameter "X-Request-ID" by the action definition software application to define the action. API request details 802 may be similarly adjusted to represent the HTTP cookie parameters of excerpt 706.

Figure 8B:
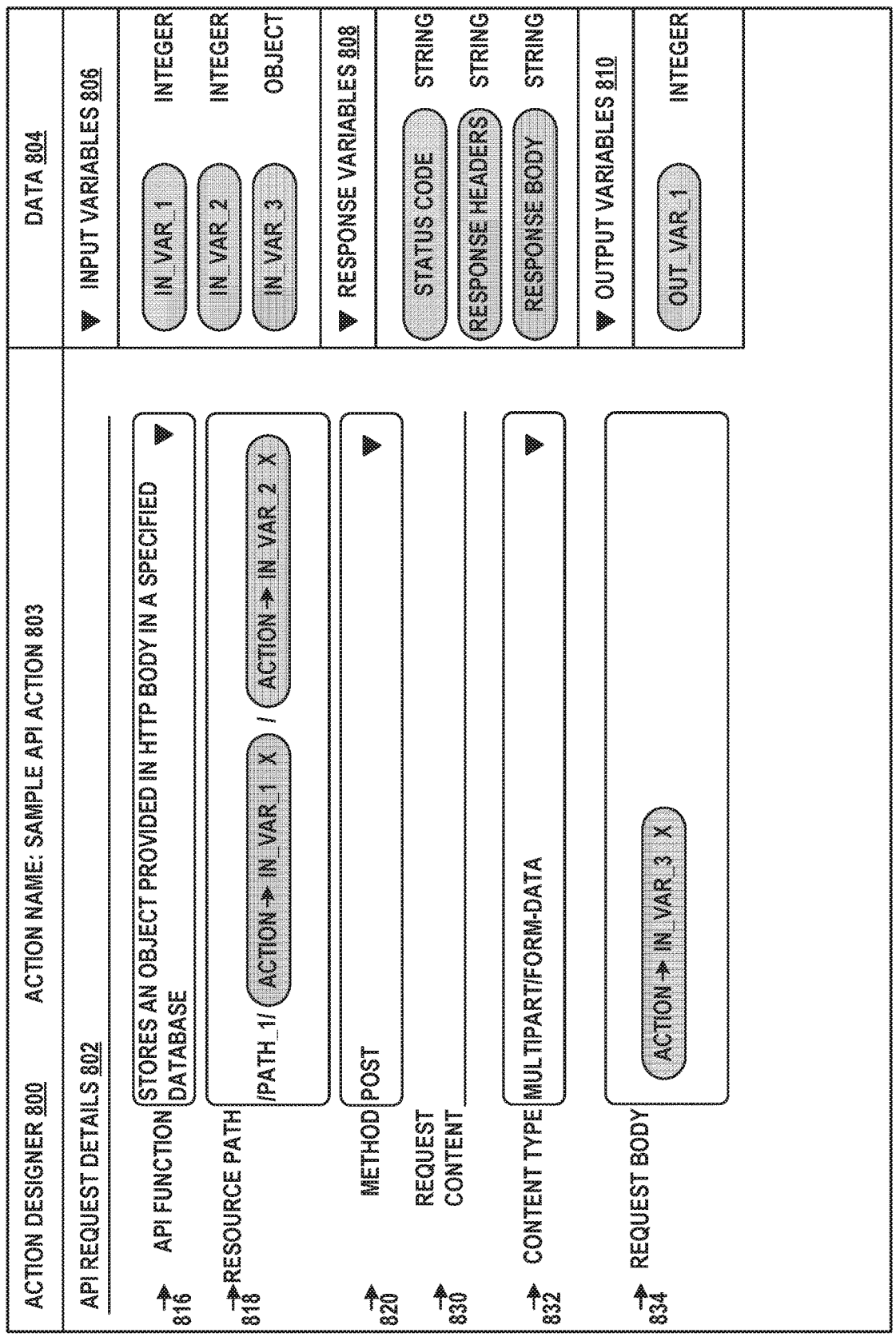
FIG. 8B depicts another action design tool graphical user interface, in accordance with example embodiments.

FIG. 8B illustrates another example action generated by the action design software application for an example API function (the API specification of which is not shown herein) that receives inputs in an HTTP body of a request transmitted thereto during execution of a workflow. Specifically, sample API action 803 invokes execution of an API function that stores an object provided in the HTTP body in a specified database, as indicated in drop-down box 816. This function takes as input integers "in_var_1" and "in_var_2," which may specify the database (e.g., user database), and an object "in_var_3," which may contain the data to be stored in the specified database (e.g., name, address, and other identifying info associated with a user account to be created and/or stored in the database). The function generates an integer output "out_var_1" which may indicate whether or not an entry was successfully created in the database to store the contents of "in_var_3."

API request details 802 are populated according to the API specification to indicate that the values of "in_var_1" and "in_var_2" are to be provided to the API function as resource path parameters, as shown by corresponding pills placed in resource path 818. Additionally, drop-down box 820 indicates that the POST HTTP method is to be used to invoke this API function. Further, request content section 830 is similarly populated according to the specification. Namely, drop-down box 832 specifies the content type being transmitted in the HTTP body (e.g., multipart/form-data, application/x-www-form-urlencoded, application/json, application/xml, text/plain, etc.) and request body 834 is populated with the pill that represents object "in_var_3" containing the values to be provided in the HTTP body. In some cases, the API function may allow multiple different content types to be used as alternatives. Thus, the selection at drop-down box 832 may indicate how the values stored in "in_var_3" are to be mapped and formatted in the HTTP request sent to the API during execution.

Notably, "in_var_3" may represent a complex data object that defines a hierarchical arrangement of a plurality of different data types. The structure of this complex data object may be specified by the API specification and thus automatically defined by the action definition software application based on the API specification. During execution of the action, the values stored by this complex object may be extracted therefrom and formatted according to the HTTP content type specified by the API specification (e.g., as indicated by drop-down box 832). For example, when the request type is "application/json," the contents of the object "in_var_3" may be formatted according to the JSON format. Similarly, when the request type is "application/x-www-form-urlencoded," the complex object may be formatted as a plurality of key-value pairs separated by the "&" symbol, much like a query parameters.

After API request details 802 of sample API action 801 and/or 803 are populated by the action design software application, the action may be ready to be saved and published to be used in workflows. In this way, actions may be created for many more API functions than would be practically possible if such definitions had to be carried out manually without any guidance or assistance from the action definition software application. For example, definition of multiple actions corresponding to multiple different API functions using the action definition software application may involve only one manual step of identifying the API specification to be used, while the remaining steps of the action definition are automated.

The actions defined by action definition software application may, in addition to invoking an API function, perform other operations. An example action may process the outputs of the API function and provide output variable values that differ from those provided by the API. For example, the API may provide historic temperature data in Fahrenheit, and the action may convert this data to Celsius before providing it as an output. In another example, the action may invoke multiple different functions of one or more different APIs, thus allowing the functionality of multiple different third-party computing systems to be combined in one action. Notably, rather than having a single action perform multiple operations, a similar effect may be achieved by combining in one workflow multiple different actions that each perform one of these multiple operations.

VIII. EXAMPLE WORKFLOW DESIGN OPERATIONS

Figure 9:
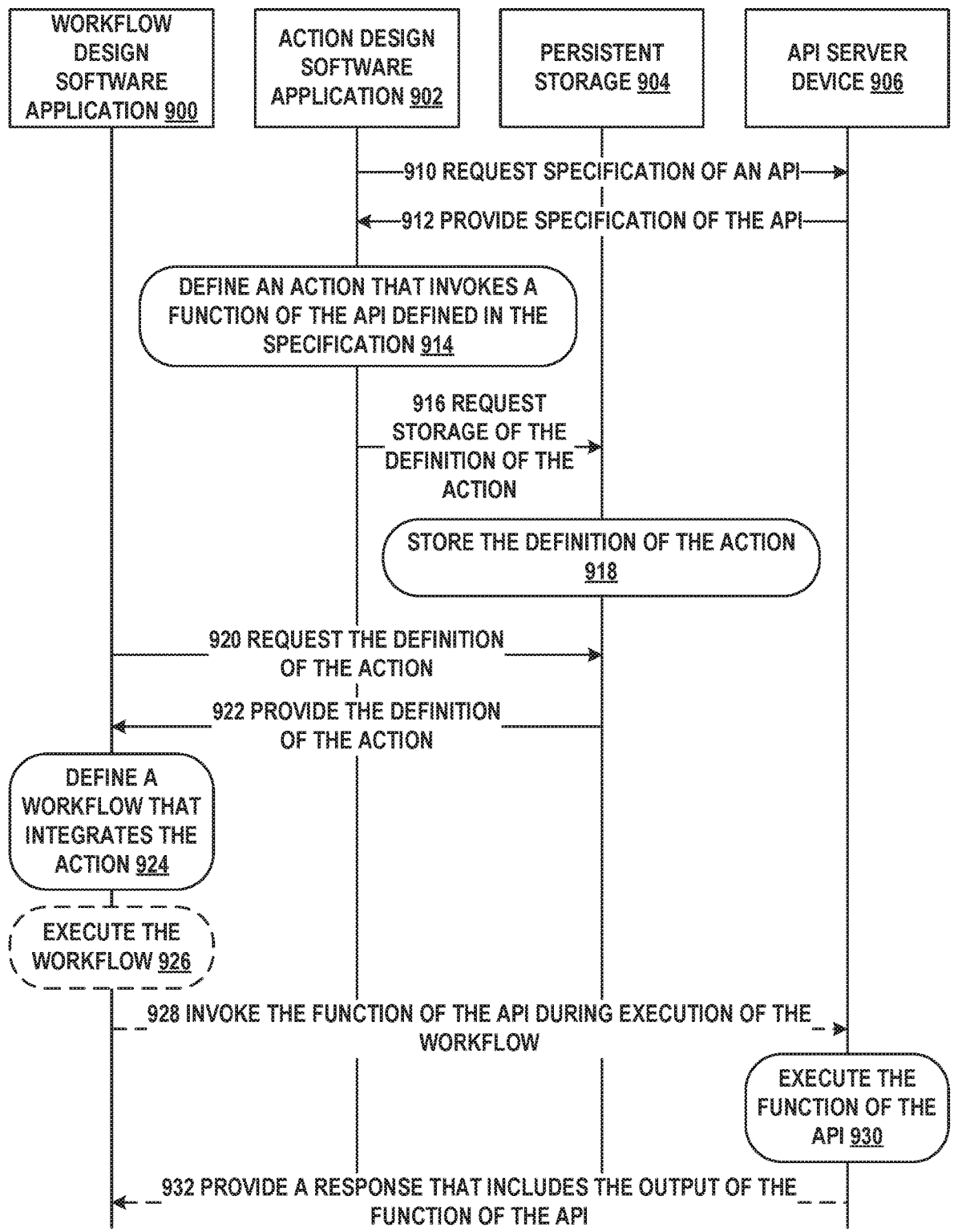
FIG. 9 depicts a message diagram, in accordance with example embodiments.

FIG. 9 illustrates a message diagram of operations involved in defining a workflow which includes an action that invokes execution of one or more functions of an API. Specifically, FIG. 9 illustrates workflow design software application 900, action design software application 902, persistent storage 904, and API server device 906.

Workflow design software application 900 is configured to define workflows that include one or more actions that have been defined by action design software application 902. Workflow design software application 900 may alternatively be referred to as a software-based workflow design tool. Similarly, action design software application 902 may alternatively be referred to as a software-based action design tool. Persistent storage 904 may, in some implementations, take the form of a database. In one example, workflow design software application 900, action design software application 902, and persistent storage 904 may be disposed in or form part of a computational instance (e.g., computational instance 322) of remote network management platform 320. This computational instance may be assigned to managed network 300 and used to define workflows therefor. API server device 906 may for part of a third-party computing system that provides and maintains the API invoked by one or more of the actions defined by action design software application 902.

Action design software application 902 may be configured to transmit to API server device 906 a request for a specification of the API, as indicated by arrow 910. Based on or in response to the request at arrow 910, API server device 906 may be configured to transmit to action design software application 902 the specification of the API, as indicated by arrow 912. For example, the request may take the form of an HTTP request transmitted to the target URL associated with API server device 906. In response to this request, API server device 906 may provide an HTTP response that includes therein the API specification. Alternatively or additionally, text of the API specification may be copied from a web page provided by API server device 906 and pasted into a corresponding portion of a user interface provided by action design software application 902. The API specification may be similar to that illustrated by excerpts 700-706 in FIGS. 7A-7D.

Based on or in response to reception of the specification at arrow 912, action design software application 902 may be configured to define an action that invokes a function of the API defined in the specification, as indicated by block 914. Definition of the action may include the operations discussed with respect to FIGS. 8A, 8B, and 11, including defining input and output variables, mapping the input variables to parameters of the API function, and mapping of parts of the API response to the output variables, among other operations. Based on or in response to definition of the action at block 914, action design software application 902 may be configured to request storage of the definition of the action, as indicated by arrow 916. Based on or in response to this request, persistent storage 904 may be configured to store therein the definition of the action, as indicated by block 918.

When workflow design software application 900 is used to define a workflow, the action defined at block 914 may be provided (e.g., displayed by way of a user interface) as one of a plurality of actions available for integration into the workflow. For example, the action may be available as part of the integration-based actions in menu 636 of FIG. 6D. When this action is selected to be included in the workflow, workflow design software application 900 may be configured to request from persistent storage 904 the definition of the action, as indicated by arrow 920. Based on or in response to the request at arrow 920, persistent storage 904 may be configured to provide to workflow design software application 900 the definition of the action, as indicated by arrow 922.

Based on or in response to reception of the definition of the action at arrow 922, workflow design software application 900 may be configured to generate a workflow that integrates the action, as indicated by block 924. Definition of the workflow may involve specifying connections between (i) the input variables of the action and (ii) output variables of other actions or other sources of data (e.g., database entries), specifying connections between (i) the output variables of the action and (ii) input variables of other actions, specifying logic that defines when the different actions are to be executed, and specifying triggers that cause aspects of the workflow to be executed, among other operations.

Based on defining the workflow at block 924, workflow design software application 900 may be configured to execute the workflow, as indicated by block 926. Notably, however, block 926 is drawn with a dashed line to indicate that the workflow may alternatively be executed by other software applications or computing devices. Arrows 928 and 932 are similarly drawn as dashed lines for the same reason. That is, one application or device may be used to define a workflow while another application or device executes the workflow.

Based on or in response to execution of the workflow at block 926 or, more specifically, one or more actions thereof, workflow design software application 900 may be configured to invoke the function of the API during execution of the workflow, as indicated by arrow 928. For example, workflow design software application 900 may generate a modified URL that includes therein any resource path parameters and query parameters according to the action definition. Workflow design software application 900 may transmit to this modified URL an HTTP request that includes therein any HTTP header, body, and/or cookie parameters specified by the action definition. Based on or in response to reception of the request at arrow 928, API server device 906 may be configured to execute the function of the API specified by this request, as indicated by block 930. Notably, in some implementations, the API function may be executed by one or more server devices other than the server device from which the API specification is obtained.

Based on or in response to execution of the function at block 930, API server device 906 may be configured to transmit, to workflow design software application 900, a response that includes therein the output of the function of the API. For example, the response may be an HTTP response that includes in one or more fields thereof the values of the outputs of the API function. In some implementations, the workflow may invoke one or more additional functions of the API, thus repeating the operations of arrow 928, block 930, and arrow 932, perhaps with different input values and output values.

Figure 10:
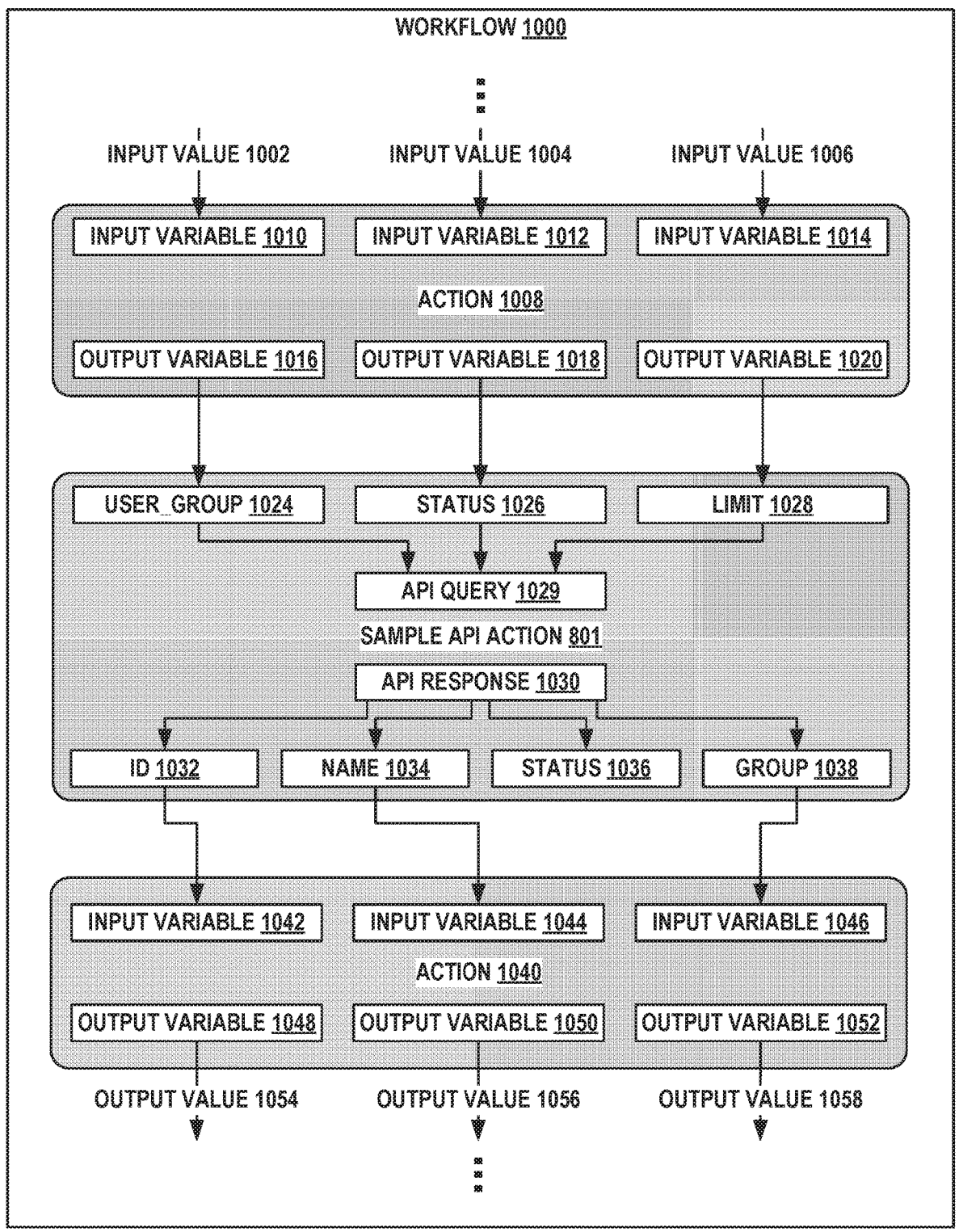
FIG. 10 depicts a workflow, in accordance with example embodiments.

FIG. 10 illustrates a diagrammatic representation of workflow 1000. Workflow 1000 includes integrated therein sample API action 801 defined in FIG. 8, and actions 1008 and 1040. The variables of actions 801, 1008, and 1040 are shown interconnected to illustrate an example flow of data therethrough. Notably, in some implementations, workflow 1000 may include additional actions, as indicated by the ellipses, or fewer actions.

Action 1008 includes input variables 1010, 1012, and 1014. During execution of workflow 1000, input variables 1010, 1012, and 1014 of action 1008 are assigned input values 1002, 1004, and 1006, respectively. Input values 1002, 1004, and 1006 may represent, among other possibilities, the outputs of other actions in workflow 1000, user input, or data retrieved from databases. Action 1008 additionally includes output variables 1016, 1018, and 1020, each of which represents one or more of input values 1002, 1004, or 1006 processed according to the logic defined by action 1008. For example, output variable 1020 may store a modified version of a string (e.g., a name, reformatted as {first name}, {last name}) retrieved from a database and provided to action 1008 as input value 1002 (e.g., the name, originally formatted as {last name}, {middle initial}, {first name}). The output variables 1016, 1018, and 1020 are connected to the input variables user_group 1024, status 1026, and limit 1028, respectively, of sample API action 801, thus indicating how the values of these variables are propagated through the workflow.

Sample API action 801 is configured to generate API query 1029 based on the values of user_group 1024, status 1026, and limit 1028, as previously described. API query 1029 is transmitted to the API to invoke execution of the corresponding function thereof. Similarly, sample API action 801 is configured to receive API response 1030 from the API server device. API response 1030 includes therein the output values of the API function invoked by API query 1029. These output values are mapped by sample API action 801 to corresponding output variables id 1032, name 1034, status 1036, and group 1038.

The values of output variables id 1032, name 1034, and group 1038 are, in turn, assigned and propagated to input variables 1042, 1044, and 1046 of action 1040. Output variable status 1036 might not be used by action 1040 and is thus not assigned to any input variables thereof. Action 1040 processes input variables 1042, 1044, and 1046 to generate output values 1054, 1056, and 1058 of output variables 1048, 1050, and 1052, respectively.

Thus, the integration of sample API action 801 into a workflow allows sample API 801 to operate on the outputs of action 1008 and allows action 1040 to operate on the outputs of sample API action 801. In other words, sample API action 801 allows the corresponding API function to be invoked as if it were part of the same computing system as actions 1008 and 1040. Additionally, since sample API action 801 is automatically defined by the action definition software application, programming workflow 1000 generally only involves defining the connections between the input and output variables of actions 801, 1008, and 1040. Thus, the workflow designer might not have to know many details, if any, regarding the API function represented by sample API action 801.

IX. EXAMPLE OPERATIONS

Figure 11:
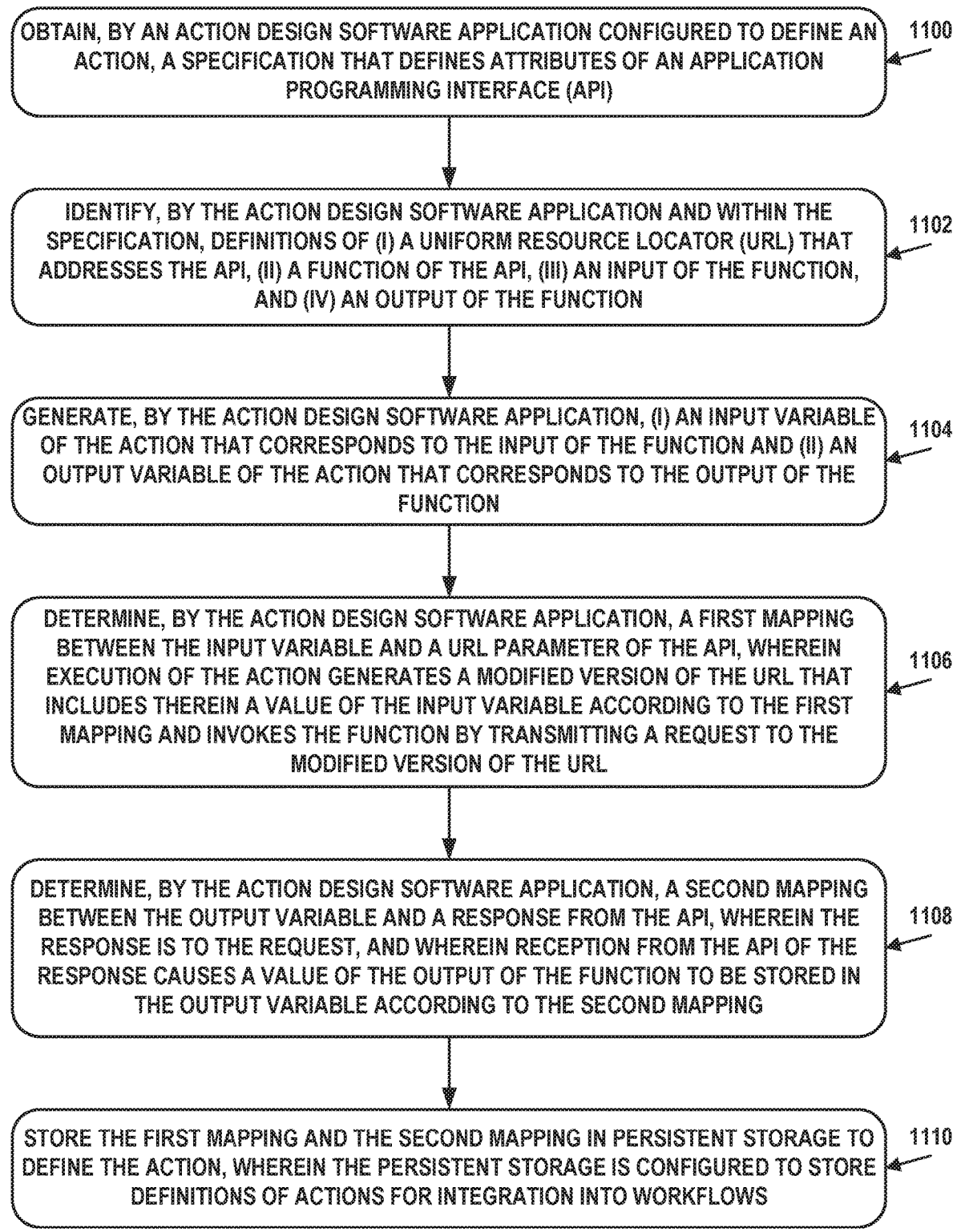
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 involves obtaining, by an action design software application configured to define an action, a specification that defines attributes of an API.

Block 1102 involves identifying, by the action design software application and within the specification, definitions of (i) a URL that addresses the API, (ii) a function of the API, (iii) an input of the function, and (iv) an output of the function.

Block 1104 involves generating, by the action design software application, (i) an input variable of the action that corresponds to the input of the function and (ii) an output variable of the action that corresponds to the output of the function.

Block 1106 involves determining, by the action design software application, a first mapping between the input variable and a URL parameter of the API. Execution of the action generates a modified version of the URL that includes therein a value of the input variable according to the first mapping and invokes the function by transmitting a request to the modified version of the URL.

Block 1108 involves determining, by the action design software application, a second mapping between the output variable and a response from the API, where the response is to the request. Reception from the API of the response causes a value of the output of the function to be stored in the output variable according to the second mapping.

Block 1110 involves storing the first mapping and the second mapping in persistent storage to define the action. The persistent storage is configured to store definitions of actions for integration into workflows.

In some embodiments, the action may be a first action of a plurality of actions. The action design software application may form part of a computing system that includes a workflow design software application. The workflow design software application may be configured to define workflows that include one or more of the plurality of actions. The workflow design software application may be configured to perform, by way of the one or more processors of the computing system, operations that include receiving selection of the first action and a second action to define a workflow. The second action may precede the first action in the workflow. The operations may also include receiving an assignment of a second output variable of the second action to the input variable of the first action. The operations may further include generating a connection between (i) the second output variable and (ii) the input variable. A value of the second output variable may be passed from the second action to the input variable of the first action during execution of the workflow.

In some embodiments, the action may be a first action of a plurality of actions. The action design software application may form part of a computing system that includes a workflow design software application. The workflow design software application may be configured to define workflows that include one or more of the plurality of actions. The workflow design software application may be configured to perform, by way of the one or more processors of the computing system, operations that include receiving selection of the first action and a second action to define a workflow. The first action may precede the second action in the workflow. The operations may also include receiving an assignment of the output variable of the first action to a second input variable of the second action. The operations may further include generating a connection between (i) the output variable and (ii) the second input variable. A value of the output variable may be passed from the first action to the second input variable of the second action during execution of the workflow.

In some embodiments, the URL parameter of the API may include at least one of (i) a URL resource path parameter that identifies a specific resource provided by a server device that hosts the API or (ii) a URL query parameter comprising a key and value pair.

In some embodiments, obtaining the specification of the API may involve importing the specification from a computing device associated with the API using a target URL.

In some embodiments, obtaining the specification of the API may involve receiving the specification as text input by way of a user interface provided by the action design software application.

In some embodiments, an additional definition of an additional input of the function may be identified within the specification. An additional input variable of the action that corresponds to the additional input of the function may be generated. A third mapping may be determined between the additional input variable and a header parameter to be provided to the API as an HTTP header of the request. Execution of the action generates the request that may include in the HTTP header thereof an additional value of the additional input variable according to the third mapping. The third mapping may be stored in the persistent storage to further define the action.

In some embodiments, an additional definition of an additional input of the function may be identified within the specification. An additional input variable of the action that corresponds to the additional input of the function may be generated. A third mapping may be determined between the additional input variable and a body parameter to be provided to the API as part of an HTTP body of the request. Execution of the action generates the request that may include, in the HTTP body thereof, an additional value of the additional input variable according to the third mapping. The third mapping may be stored in the persistent storage to further define the action.

In some embodiments, an additional definition of an additional input of the function may be identified within the specification. An additional input variable of the action that corresponds to the additional input of the function may be generated. A third mapping may be determined between the additional input variable and a cookie parameter to be provided to the API within an HTTP cookie header of the request. Execution of the action generates the request that may include, in the HTTP cookie header thereof, an additional value of the additional input variable according to the third mapping. The third mapping may be stored in the persistent storage to further define the action.

In some embodiments, the input may be one of a plurality of inputs. The input variable may be one of a plurality of input variables. Based on the specification and for each respective input variable of the plurality of input variables, an attribute may be determined indicating whether the corresponding input is optional or required. The action may be executable without providing values for input variables corresponding to optional inputs. The action might not be executable without providing values for input variables corresponding to required inputs. An indication of the attribute may be stored for each respective input variable in the persistent storage to further define the action.

In some embodiments, a default value of a particular input variable corresponding to a particular optional input may be determined based on the specification. The function may be executed with the default value as the particular optional input when an alternative value is not assigned to the particular input variable. The default value of the particular input variable may be stored in the persistent storage to further define the action.

In some embodiments, the action design software application may be configured to define a different version of the action for each release version of the API. Each release version of the API may be associated with a corresponding specification that defines the attributes thereof.

In some embodiments, generating (i) the input variable and (ii) the output variable may involve determining that the input of the function is of a first data type, determining that the output of the function is of a second data type, and generating (i) the input variable having the first data type and (ii) the output variable having the second data type. Integration of the action into a workflow may include validating that a value assigned to the input variable is of the first data type and that the output variable is passed to an additional variable of the second data type.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for building workflows, the system comprising:
one or more hardware processors; and
a non-transitory memory storing instructions that, when executed by the one or more hardware processors, causes the one or more hardware processors to perform operations comprising:
receiving a specification of an application programming interface (API), wherein the specification defines a function of the API, an input to the function, an output from the function, and a uniform resource locator (URL) that addresses the API;
receiving, via a graphical user interface (GUI), a first selection defining a first action that invokes the function of the API, an input to the first action, and an output from the first action;
generating a first mapping between the input to the first action and the input to the function based on the specification;
generating a second mapping between the output from the function and the output from the first action based on the specification;
receiving, via the GUI, a second selection defining a second action and an input to the second action;
generating an association between the output from the first action and the input to the second action; and
generating a workflow that comprises the first mapping and the second mapping as part of the workflow, wherein the function of the API is invokable by a user without the user referencing script associated with the API, wherein a value of the output of the first action is passed from the first action to the second action during execution of the workflow.

2. The system of claim 1, wherein the operations comprise:
receiving a second specification of a second API, wherein the second specification defines a second function of the second API, an input to the second function, an output from the second function, and a second URL that addresses the second API, wherein the second selection defines an output from the second action;
generating a third mapping between the input to the second action and the input to the second function; and
generating a fourth mapping between the output from the second function and the output from the second action.

3. The system of claim 2, wherein the workflow comprises the third mapping and the fourth mapping, wherein the second function of the second API is invokable by the user without the user referencing script associated with the second API.

4. The system of claim 1, wherein generating the workflow comprises updating an existing workflow.

5. The system of claim 1, wherein the specification of the API is received into an existing workflow.

6. The system of claim 1, wherein the output from the first action is provided as the input to the second action.

7. The system of claim 1, wherein the second action invokes the function of the API, a second function of the API, or a function of a second API, or a combination thereof.

8. The system of claim 1, wherein generating the workflow comprises:
receiving selection of the first action and the second action to define the workflow, wherein the first action precedes the second action in the workflow; and
receiving an assignment of the output from the first action to the input to the second action.

9. The system of claim 1, wherein the first mapping is based on a URL resource path parameter identifying a resource provided by a server device hosting the API.

10. A non-transitory computer-readable medium comprising computer-readable code, that when executed by one or more processors, causes the one or more processors to perform operations comprising:
receiving a first selection defining a first action during execution of a workflow, wherein the workflow has been defined based on:
a specification of an application programming interface (API), wherein the specification defines a function of the API, an input to the function, an output from the function, and a uniform resource locator (URL) that addresses the API;

the first selection defining the first action that invokes the function of the API, an input to the first action, and an output from the first action;

a first mapping between the input to the first action and the input to the function; and a second mapping between the output from the function and the output from the first action, wherein the input to the first action invokes the function of the API without referencing script associated with the API;

a second selection defining a second action and an input to the second action;

an association between the output from the first action and the input to the second action;

invoking the function of the API using the URL that addresses the API and the input to the function, based on the input to the first action and the first mapping;

receiving, via the API, the output from the function; and providing the output from the first action based on the output from the function and the second mapping, wherein a value of the output of the first action is passed from the first action to the second action during execution of the workflow.

11. The non-transitory computer-readable medium of claim 10, wherein the workflow is defined based on:

a second specification of a second API, wherein the second specification defines a second function of the second API, an input to the second function, an output from the second function, and a second URL that addresses the second API, wherein the second selection defines an output from the second action;

a third mapping between the input to the second action and the input to the second function; and a fourth mapping between the output from the second function and the output to the second action, wherein the input to the second action invokes the second function of the second API without referencing script associated with the second API.

12. The non-transitory computer-readable medium of claim 10, wherein the workflow has been defined based:

receiving selection of the first action and a second action, wherein the first action precedes the second action in the workflow; and receiving an assignment of the output from the first action to the input to the second action.

13. The non-transitory computer-readable medium of claim 10, wherein the specification defines a second function of the API, an input to the second function, and an output from the second function.

14. The non-transitory computer-readable medium of claim 13, wherein the first action invokes the second function of the API.

15. The non-transitory computer-readable medium of claim 10, wherein the output from the first action is provided as the input to a second action.

16. A method for generating workflows, the method comprising:

receiving a specification of an application programming interface (API), wherein the specification defines a function of the API, an input to the function, an output from the function, and a uniform resource locator (URL) that addresses the API;

receiving, via a graphical user interface (GUI), a first selection an input defining a first action that invokes the function of the API, an input to the first action, and an output from the first action;

generating a first mapping between the input to the first action and the input to the function;

generating a second mapping between the output from the function and the output from the first action based on the specification;

receiving, via the GUI, a second selection defining a second action and an input to the second action;

generating an association between the output from the first action and the input to the second action; and generating a workflow that comprises the first mapping and the second mapping as part of the workflow, wherein the function of the API is invokable by a user without the user referencing script associated with the API, wherein a value of the output of the first action is passed from the first action to the second action during execution of the workflow.

17. The method of claim 16, comprising:

receiving a second specification of a second API, wherein the second specification defines a second function of the second API, an input to the second function, an output from the second function, and a second URL that addresses the second API, wherein the second selection defines an output from the second action;

generating a third mapping between the input to the second action and the input to the second function; and generating a fourth mapping between the output from the second function and the output from the second action.

18. The method of claim 17, wherein the workflow comprises the third mapping and the fourth mapping, wherein the second function of the second API is invokable by the user without the user referencing script associated with the second API.

19. The method of claim 16, wherein generating the workflow comprises updating an existing workflow.

20. The method of claim 16, wherein the output from the first action is provided as the input to the second action.

* * * * *

UNITED STATES PATENT AND TRADEMARK OFFICE
CERTIFICATE OF CORRECTION

PATENT NO. : 11,068,241 B2
APPLICATION NO. : 16/705993
DATED : July 20, 2021
INVENTOR(S) : Swope et al.

Page 1 of 1

It is certified that error appears in the above-identified patent and that said Letters Patent is hereby corrected as shown below:

In the Claims

Column 42, Line 12, Claim 16, please delete the phrase "an input" between the words "selection" and "defining".

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*